(12) United States Patent
Lapstun et al.

(10) Patent No.: US 9,706,117 B2
(45) Date of Patent: *Jul. 11, 2017

(54) WIDE-AREA AERIAL CAMERA SYSTEMS

(71) Applicant: NEARMAP AUSTRALIA PTY LTD., Sydney (AU)

(72) Inventors: Paul Lapstun, Rodd Point (AU); Mark Harold Tarlinton, Marrickville (AU); David Arnold Bleads, Tennyson (AU)

(73) Assignee: nearmap Australia Pty Ltd., Sydney (AU)

( * ) Notice: Subject to any disclaimer, the term of this patent is extended or adjusted under 35 U.S.C. 154(b) by 0 days.

This patent is subject to a terminal disclaimer.

(21) Appl. No.: 14/718,528

(22) Filed: May 21, 2015

(65) Prior Publication Data

US 2015/0373267 A1 Dec. 24, 2015

Related U.S. Application Data

(63) Continuation of application No. 14/478,380, filed on Sep. 5, 2014, now Pat. No. 9,052,571, which is a continuation-in-part of application No. 14/310,523, filed on Jun. 20, 2014, now Pat. No. 9,046,759.

(51) Int. Cl.
| | |
|---|---|
| *H04N 5/232* | (2006.01) |
| *G03B 15/00* | (2006.01) |
| *G01C 11/02* | (2006.01) |
| *G03B 37/00* | (2006.01) |
| *G06T 3/40* | (2006.01) |
| *H04N 5/247* | (2006.01) |
| *H04N 7/18* | (2006.01) |
| *G03B 37/04* | (2006.01) |

(52) U.S. Cl.
CPC ......... *H04N 5/23238* (2013.01); *G01C 11/02* (2013.01); *G03B 15/006* (2013.01); *G03B 37/04* (2013.01); *G06T 3/4038* (2013.01); *H04N 5/247* (2013.01); *H04N 7/181* (2013.01)

(58) Field of Classification Search
CPC ...... G03B 15/006; G03B 37/00; G03B 37/04; B64D 47/08; G01C 11/02; H04N 7/18
See application file for complete search history.

(56) References Cited

U.S. PATENT DOCUMENTS

| | | | |
|---|---|---|---|
| 1,735,109 A | 11/1929 | Eliel | |
| 1,797,849 A | 3/1931 | Aschenbrenner | |
| 2,665,481 A | 1/1954 | Henry | |
| 3,109,169 A * | 10/1963 | Snyder | G01S 7/04 342/191 |
| 4,989,086 A * | 1/1991 | Schaff et al. | 348/147 |

(Continued)

OTHER PUBLICATIONS

U.S. Appl. No. 13/873,818, filed Apr. 30, 2013, Nixon.

(Continued)

*Primary Examiner* — W B Perkey
(74) *Attorney, Agent, or Firm* — Oblon, McClelland, Maier & Neustadt, L.L.P.

(57) ABSTRACT

A system for capturing aerial images, the system comprising at least one camera unit, the at least one camera unit comprising at least one detail camera, the pointing direction of the at least one detail camera time-multiplexed via a steerable mirror to implement a virtual array of cameras with overlapping fields of view, thereby to allow the at least one detail camera to capture an extended field of view.

17 Claims, 44 Drawing Sheets

(56) References Cited

U.S. PATENT DOCUMENTS

| | | | |
|---|---|---|---|
| 5,550,669 A * | 8/1996 | Patel | 359/224.1 |
| 5,625,409 A * | 4/1997 | Rosier et al. | 348/117 |
| 5,894,323 A | 4/1999 | Kain et al. | |
| 6,320,611 B1 * | 11/2001 | Pepin | G01C 11/025 348/147 |
| 6,370,329 B1 * | 4/2002 | Teuchert | G03B 17/48 359/556 |
| 6,834,163 B2 | 12/2004 | Trunz et al. | |
| 7,597,489 B2 | 10/2009 | Horak et al. | |
| 7,899,311 B1 | 3/2011 | Kearney et al. | |
| 8,031,177 B2 | 10/2011 | Lapstun et al. | |
| 8,331,615 B2 | 12/2012 | Furukawa et al. | |
| 8,497,905 B2 | 7/2013 | Nixon | |
| 8,675,068 B2 | 3/2014 | Nixon | |
| 9,046,759 B1 * | 6/2015 | Tarlinton et al. | |
| 9,052,571 B1 * | 6/2015 | Lapstun et al. | |
| 2007/0188610 A1 | 8/2007 | Micotto et al. | |
| 2007/0242135 A1 * | 10/2007 | Rosenblum et al. | 348/144 |
| 2010/0013927 A1 * | 1/2010 | Nixon | G01C 11/06 348/144 |
| 2010/0295855 A1 | 11/2010 | Sasakawa et al. | |
| 2012/0200703 A1 | 8/2012 | Nadir et al. | |
| 2012/0320203 A1 | 12/2012 | Liu | |
| 2013/0088567 A1 * | 4/2013 | Fitzpatrick et al. | 348/37 |
| 2013/0235199 A1 | 9/2013 | Nixon | |
| 2013/0321626 A1 * | 12/2013 | Finn et al. | 348/145 |
| 2014/0198211 A1 * | 7/2014 | Giuffrida | H04N 5/23222 348/144 |

OTHER PUBLICATIONS

U.S. Appl. No. 14/618,551, filed Feb. 10, 2015, Millin et al.
U.S. Appl. No. 14/687,544, filed Apr. 15, 2015, Lapstun et al.
Wolf, et al., Elements of Photogrammetry with Application in GIS, McGraw-Hill, 2000, pp. 383-390.
The Manual of Photogrammetry, Chapter 10, Analytical Photogrammetric Operations, Sixth Edition, American Society for Photogrammetry and Remote Sensing (ASPRS), pp. 860-885.
Triggs, et al., Bundle Adjustment—A Modern Synthesis, Lecture Notes in Computer Science, vol. 1882, Jan. 2000, 75 pages.
U.S. Appl. No. 14/718,472, filed May 21, 2015, Tarlinton, et al.
U.S. Appl. No. 14/735,504, filed Jun. 10, 2015, Lapstun, et al.

* cited by examiner

| altitude | focal length | | | | | | 30° swath | 45° swath |
|---|---|---|---|---|---|---|---|---|
| | 100mm | 200mm | 300mm | 400mm | 500mm | 600mm | | |
| 2,000' | 3.0cm | 1.5cm | 1.0cm | 0.7cm | 0.6cm | 0.5cm | 0.3km | 0.5km |
| 4,000' | 6.0cm | 3.0cm | 2.0cm | 1.5cm | 1.2cm | 1.0cm | 0.7km | 1.0km |
| 6,000' | 8.9cm | 4.5cm | 3.0cm | 2.2cm | 1.8cm | 1.5cm | 1.0km | 1.5km |
| 8,000' | 11.9cm | 6.0cm | 4.0cm | 3.0cm | 2.4cm | 2.0cm | 1.3km | 2.0km |
| 10,000' | 14.9cm | 7.4cm | 5.0cm | 3.7cm | 3.0cm | 2.5cm | 1.6km | 2.5km |
| 12,000' | 17.9cm | 8.9cm | 6.0cm | 4.5cm | 3.6cm | 3.0cm | 2.0km | 3.0km |
| 14,000' | 20.8cm | 10.4cm | 6.9cm | 5.2cm | 4.2cm | 3.5cm | 2.3km | 3.5km |
| 16,000' | 23.8cm | 11.9cm | 7.9cm | 6.0cm | 4.8cm | 4.0cm | 2.6km | 4.0km |
| 18,000' | 26.8cm | 13.4cm | 8.9cm | 6.7cm | 5.4cm | 4.5cm | 2.9km | 4.5km |
| 20,000' | 29.8cm | 14.9cm | 9.9cm | 7.4cm | 6.0cm | 5.0cm | 3.3km | 5.1km |
| 22,000' | 32.7cm | 16.4cm | 10.9cm | 8.2cm | 6.5cm | 5.5cm | 3.6km | 5.6km |
| 24,000' | 35.7cm | 17.9cm | 11.9cm | 8.9cm | 7.1cm | 6.0cm | 3.9km | 6.1km |
| 26,000' | 38.7cm | 19.3cm | 12.9cm | 9.7cm | 7.7cm | 6.4cm | 4.2km | 6.6km |
| 28,000' | 41.7cm | 20.8cm | 13.9cm | 10.4cm | 8.3cm | 6.9cm | 4.6km | 7.1km |
| 30,000' | 44.6cm | 22.3cm | 14.9cm | 11.2cm | 8.9cm | 7.4cm | 4.9km | 7.6km |
| 32,000' | 47.6cm | 23.8cm | 15.9cm | 11.9cm | 9.5cm | 7.9cm | 5.2km | 8.1km |
| 34,000' | 50.6cm | 25.3cm | 16.9cm | 12.6cm | 10.1cm | 8.4cm | 5.6km | 8.6km |
| 36,000' | 53.6cm | 26.8cm | 17.9cm | 13.4cm | 10.7cm | 8.9cm | 5.9km | 9.1km |
| 38,000' | 56.5cm | 28.3cm | 18.8cm | 14.1cm | 11.3cm | 9.4cm | 6.2km | 9.6km |
| 40,000' | 59.5cm | 29.8cm | 19.8cm | 14.9cm | 11.9cm | 9.9cm | 6.5km | 10.1km |
| 42,000' | 62.5cm | 31.2cm | 20.8cm | 15.6cm | 12.5cm | 10.4cm | 6.9km | 10.6km |
| 44,000' | 65.5cm | 32.7cm | 21.8cm | 16.4cm | 13.1cm | 10.9cm | 7.2km | 11.1km |
| 46,000' | 68.4cm | 34.2cm | 22.8cm | 17.1cm | 13.7cm | 11.4cm | 7.5km | 11.6km |
| 48,000' | 71.4cm | 35.7cm | 23.8cm | 17.9cm | 14.3cm | 11.9cm | 7.8km | 12.1km |
| 50,000' | 74.4cm | 37.2cm | 24.8cm | 18.6cm | 14.9cm | 12.4cm | 8.2km | 12.6km |
| 52,000' | 77.4cm | 38.7cm | 25.8cm | 19.3cm | 15.5cm | 12.9cm | 8.5km | 13.1km |
| 54,000' | 80.3cm | 40.2cm | 26.8cm | 20.1cm | 16.1cm | 13.4cm | 8.8km | 13.6km |
| 56,000' | 83.3cm | 41.7cm | 27.8cm | 20.8cm | 16.7cm | 13.9cm | 9.1km | 14.1km |
| 58,000' | 86.3cm | 43.1cm | 28.8cm | 21.6cm | 17.3cm | 14.4cm | 9.5km | 14.6km |
| 60,000' | 89.3cm | 44.6cm | 29.8cm | 22.3cm | 17.9cm | 14.9cm | 9.8km | 15.2km |
| | 13.7° | 6.9° | 4.6° | 3.4° | 2.7° | 2.3° | longitudinal FOV | |
| | 20.4° | 10.3° | 6.9° | 5.1° | 4.1° | 3.4° | lateral FOV | |
| | 0.9° | 0.9° | 0.9° | 0.6° | 0.5° | 0.4° | lateral overlap | |
| | 19.5° | 9.4° | 6.0° | 4.5° | 3.6° | 3.0° | lateral spacing | |
| | 2 | 4 | 5 | 7 | 9 | 10 | 30° camera count | |
| | 39.8° | 38.3° | 30.8° | 32.1° | 32.9° | 30.4° | actual FOV | |
| | 3 | 5 | 8 | 10 | 13 | 15 | 45° camera count | |
| | 59.3° | 47.7° | 48.8° | 45.6° | 47.3° | 45.4° | actual FOV | |

Fig. 22

| altitude | focal length | | | | | | 30° swath | 45° swath |
|---|---|---|---|---|---|---|---|---|
| | 700mm | 800mm | 900mm | 1000mm | 1100mm | 1200mm | | |
| 2,000' | 0.4cm | 0.4cm | 0.3cm | 0.3cm | 0.3cm | 0.2cm | 0.3km | 0.5km |
| 4,000' | 0.9cm | 0.7cm | 0.7cm | 0.6cm | 0.5cm | 0.5cm | 0.7km | 1.0km |
| 6,000' | 1.3cm | 1.1cm | 1.0cm | 0.9cm | 0.8cm | 0.7cm | 1.0km | 1.5km |
| 8,000' | 1.7cm | 1.5cm | 1.3cm | 1.2cm | 1.1cm | 1.0cm | 1.3km | 2.0km |
| 10,000' | 2.1cm | 1.9cm | 1.7cm | 1.5cm | 1.4cm | 1.2cm | 1.6km | 2.5km |
| 12,000' | 2.6cm | 2.2cm | 2.0cm | 1.8cm | 1.6cm | 1.5cm | 2.0km | 3.0km |
| 14,000' | 3.0cm | 2.6cm | 2.3cm | 2.1cm | 1.9cm | 1.7cm | 2.3km | 3.5km |
| 16,000' | 3.4cm | 3.0cm | 2.6cm | 2.4cm | 2.2cm | 2.0cm | 2.6km | 4.0km |
| 18,000' | 3.8cm | 3.3cm | 3.0cm | 2.7cm | 2.4cm | 2.2cm | 2.9km | 4.5km |
| 20,000' | 4.3cm | 3.7cm | 3.3cm | 3.0cm | 2.7cm | 2.5cm | 3.3km | 5.1km |
| 22,000' | 4.7cm | 4.1cm | 3.6cm | 3.3cm | 3.0cm | 2.7cm | 3.6km | 5.6km |
| 24,000' | 5.1cm | 4.5cm | 4.0cm | 3.6cm | 3.2cm | 3.0cm | 3.9km | 6.1km |
| 26,000' | 5.5cm | 4.8cm | 4.3cm | 3.9cm | 3.5cm | 3.2cm | 4.2km | 6.6km |
| 28,000' | 6.0cm | 5.2cm | 4.6cm | 4.2cm | 3.8cm | 3.5cm | 4.6km | 7.1km |
| 30,000' | 6.4cm | 5.6cm | 5.0cm | 4.5cm | 4.1cm | 3.7cm | 4.9km | 7.6km |
| 32,000' | 6.8cm | 6.0cm | 5.3cm | 4.8cm | 4.3cm | 4.0cm | 5.2km | 8.1km |
| 34,000' | 7.2cm | 6.3cm | 5.6cm | 5.1cm | 4.6cm | 4.2cm | 5.6km | 8.6km |
| 36,000' | 7.7cm | 6.7cm | 6.0cm | 5.4cm | 4.9cm | 4.5cm | 5.9km | 9.1km |
| 38,000' | 8.1cm | 7.1cm | 6.3cm | 5.7cm | 5.1cm | 4.7cm | 6.2km | 9.6km |
| 40,000' | 8.5cm | 7.4cm | 6.6cm | 6.0cm | 5.4cm | 5.0cm | 6.5km | 10.1km |
| 42,000' | 8.9cm | 7.8cm | 6.9cm | 6.2cm | 5.7cm | 5.2cm | 6.9km | 10.6km |
| 44,000' | 9.4cm | 8.2cm | 7.3cm | 6.5cm | 6.0cm | 5.5cm | 7.2km | 11.1km |
| 46,000' | 9.8cm | 8.6cm | 7.6cm | 6.8cm | 6.2cm | 5.7cm | 7.5km | 11.6km |
| 48,000' | 10.2cm | 8.9cm | 7.9cm | 7.1cm | 6.5cm | 6.0cm | 7.8km | 12.1km |
| 50,000' | 10.6cm | 9.3cm | 8.3cm | 7.4cm | 6.8cm | 6.2cm | 8.2km | 12.6km |
| 52,000' | 11.1cm | 9.7cm | 8.6cm | 7.7cm | 7.0cm | 6.4cm | 8.5km | 13.1km |
| 54,000' | 11.5cm | 10.0cm | 8.9cm | 8.0cm | 7.3cm | 6.7cm | 8.8km | 13.6km |
| 56,000' | 11.9cm | 10.4cm | 9.3cm | 8.3cm | 7.6cm | 6.9cm | 9.1km | 14.1km |
| 58,000' | 12.3cm | 10.8cm | 9.6cm | 8.6cm | 7.8cm | 7.2cm | 9.5km | 14.6km |
| 60,000' | 12.8cm | 11.2cm | 9.9cm | 8.9cm | 8.1cm | 7.4cm | 9.8km | 15.2km |

| | | | | | | |
|---|---|---|---|---|---|---|
| 2.0° | 1.7° | 1.5° | 1.4° | 1.2° | 1.1° | longitudinal FOV |
| 2.9° | 2.6° | 2.3° | 2.1° | 1.9° | 1.7° | lateral FOV |
| 0.4° | 0.3° | 0.3° | 0.3° | 0.3° | 0.3° | lateral overlap |
| 2.6° | 2.3° | 2.0° | 1.8° | 1.6° | 1.4° | lateral spacing |
| 12 | 14 | 15 | 17 | 19 | 21 | 30° camera count |
| 31.2° | 31.8° | 30.1° | 30.2° | 30.1° | 30.0° | actual FOV |
| 18 | 20 | 23 | 26 | 29 | 32 | 45° camera count |
| 46.7° | 45.3° | 46.0° | 46.0° | 45.8° | 45.6° | actual FOV |

Fig. 23

EQ 1: $g = p \cdot a / f$
EQ 2: $w = s \cdot a / f$
EQ 3: $s = 2f \cdot \tan(\beta/2)$
EQ 4: $\beta = 2 \cdot \arctan(s/2f)$
EQ 5: $w = 2a \cdot \tan(\beta/2)$
EQ 6: $\beta = 2 \cdot \arctan(w/2a)$ EQ 7: γ = N · β − (N−1)ω
EQ 8: w(N) = 2a · tan(γ/2)

EQ 9: $g(\theta) = g \cdot \sec^2(\theta)$
EQ 10: $h(\theta) = g \cdot \sec(\theta)$

WIDE-AREA AERIAL CAMERA SYSTEMS

CROSS-REFERENCE TO RELATED APPLICATIONS

This is a continuation of application Ser. No. 14/478,380, filed Sep. 5, 2014, which is a continuation-in-part of application Ser. No. 14/310,523, filed Jun. 20, 2014, the entire contents of both of which are incorporated herein by reference.

FIELD OF THE INVENTION

The present invention relates to efficient aerial camera systems and efficient methods for creating photomosaics from aerial photos.

BACKGROUND OF THE INVENTION

Accurately georeferenced photomosaics of orthophotos are becoming popular alternatives to traditional pictorial maps because they can be created automatically from aerial photos, and because they show actual useful detail on the ground.

The creation of accurate photomosaics from aerial photos is well described in the literature. See, for example, Elements of Photogrammetry with Application in GIS, Fourth Edition (Wolf et al.), and the Manual of Photogrammetry, Sixth Edition (American Society for Photogrammetry and Remote Sensing (ASPRS)).

The creation of a photomosaic requires the systematic capture of overlapping aerial photos of the area of interest, both to ensure complete coverage of the area of interest, and to ensure that there is sufficient redundancy in the imagery to allow accurate bundle adjustment, orthorectification and alignment of the photos.

Bundle adjustment is the process by which redundant estimates of ground points and camera poses are refined. Modern bundle adjustment is described in detail in "Bundle Adjustment—A Modern Synthesis" (Triggs et al.)

Bundle adjustment may operate on the positions of manually-identified ground points, or, increasingly, on the positions of automatically-identified ground features which are automatically matched between overlapping photos.

Overlapping aerial photos are typically captured by navigating a survey aircraft in a serpentine pattern over the area of interest. The survey aircraft carries an aerial camera system, and the serpentine flight pattern ensures that the photos captured by the camera system overlap both along flight lines within the flight pattern and between adjacent flight lines.

Sufficient redundancy for accurate bundle adjustment typically dictates the choice a longitudinal (forward) overlap of at least 60%, i.e. between successive photos along a flight line, and a lateral (side) overlap of at least 40%, i.e. between photos on adjacent flight lines. This is often referred to as 60/40 overlap.

The chosen overlap determines both the required flying time and the number of photos captured (and subsequently processed). High overlap is therefore expensive, both in terms of flying time and processing time, and practical choices of overlap represent a compromise between cost and photomosaic accuracy.

The use of a multi-resolution camera system provides a powerful way to reduce overlap without excessively compromising accuracy. The capture and processing of multi-resolution aerial photos is described in U.S. Pat. Nos. 8,497,905 and 8,675,068 (Nixon), the contents of which are herein incorporated by reference. Multi-resolution sets of photos allow photomosaic accuracy to be derived from the overlap between lower-resolution overview photos, while photomosaic detail is derived from higher-resolution detail photos.

U.S. Pat. Nos. 8,497,905 and 8,675,068 (Nixon) describe an external camera pod attachable to a small aircraft. An external pod has two key disadvantages: the pod is highly aircraft-specific, and space within the pod is constrained. An aircraft-specific pod limits the choice of aircraft and therefore limits operational parameters such as altitude range, and, conversely, requires significant design, testing and certification effort to adapt to different aircraft. Constrained space within the pod limits the size and therefore the focal length of camera lenses, which in turn limits the range of operating altitudes for a particular target image resolution.

SUMMARY OF THE INVENTION

In a first aspect, the present invention provides a system for capturing aerial images, the system comprising at least one camera unit, the camera unit comprising at least one overview camera, a plurality of detail cameras, and a frame for holding the cameras, each detail camera having a longer focal length than the at least one overview camera, each detail camera mounted at a different angle laterally so that the fields of view of the detail cameras overlap to form an extended lateral field of view.

The camera unit may be attachable, above a camera hole, to a floor of an aircraft or a pod carried by an aircraft, thereby providing the cameras with a view of the ground below the aircraft through the camera hole.

The system may comprise an adapter plate attachable to the floor of the aircraft or pod, the frame attachable to the adapter plate. For example, the adapter plate may attach to the floor by bolting to mounting points set into the floor, or it may attach to the floor by bolting to seat tracks attached to the floor.

The system may comprise a plurality of camera units, each camera unit mounted at a different lateral angle so that the extended lateral fields of view of the camera units overlap to form a larger extended lateral field of view.

Each detail camera may be angled inwards towards the center of the camera hole, thereby minimising the size of the camera hole required to accommodate the fields of view of the detail cameras.

Each detail camera may have a dioptric lens, a catoptric lens, or a catadioptric lens.

The pointing direction of a detail camera may be time-multiplexed via a beam-steering mechanism, thereby to provide a wider effective field of view, and the beam-steering mechanism may be a steerable mirror.

The system may comprise a computer system configured to automatically fire the detail cameras during flight such that successive detail photos overlap longitudinally.

The system may comprise at least one Global Navigation Satellite System (GNSS) receiver, the computer configured to receive and store position data from the at least one GNSS receiver in real time.

The system may comprise an inertial measurement unit (IMU), the computer configured to receive and store orientation data from the IMU in real time.

The system may comprise at least one angular motion compensation (AMC) unit, the at least one AMC unit configured to correct the effect, on at least one camera, of angular motion of the aircraft, thereby to ensure the camera points in a consistent direction over time. AMC may be provided via a steerable mirror in the optical path of the camera.

The system may comprise at least one forward motion compensation (FMC) mechanism, the at least one FMC mechanism configured to correct the effect, on at least one camera, of forward motion of the aircraft, thereby to reduce motion blur in photos captured by the camera. FMC may be provided via a steerable mirror in the optical path of the camera.

The average pointing direction of the camera units, relative to nadir, may be zero degrees or 45 degrees.

The image sensor of at least one camera may be tilted to reduce perspective foreshortening in photos captured by the camera.

DRAWINGS

Figures

FIG. 22 shows a tabulation of ground sampling distance (GSD) as a function of altitude and camera focal length between 100 mm and 600 mm.

FIG. 23 shows a tabulation of ground sampling distance (GSD) as a function of altitude and camera focal length between 700 mm and 1200 mm.

REFERENCE NUMERALS

Figure 1:
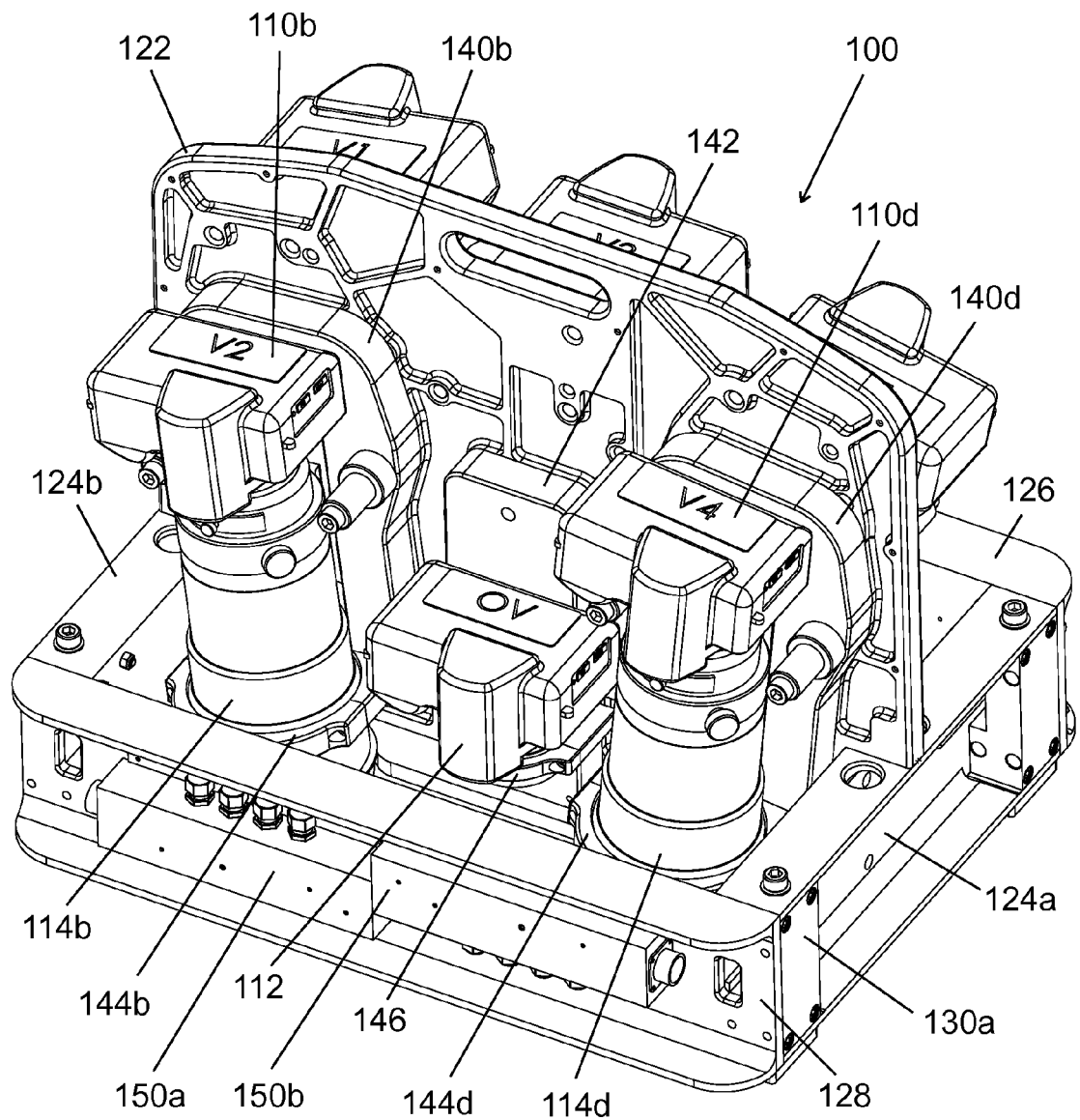
FIG. 1 shows a front view of the V5-300 HyperCamera unit, i.e. facing forwards towards the front of the aircraft.
Figure 2:
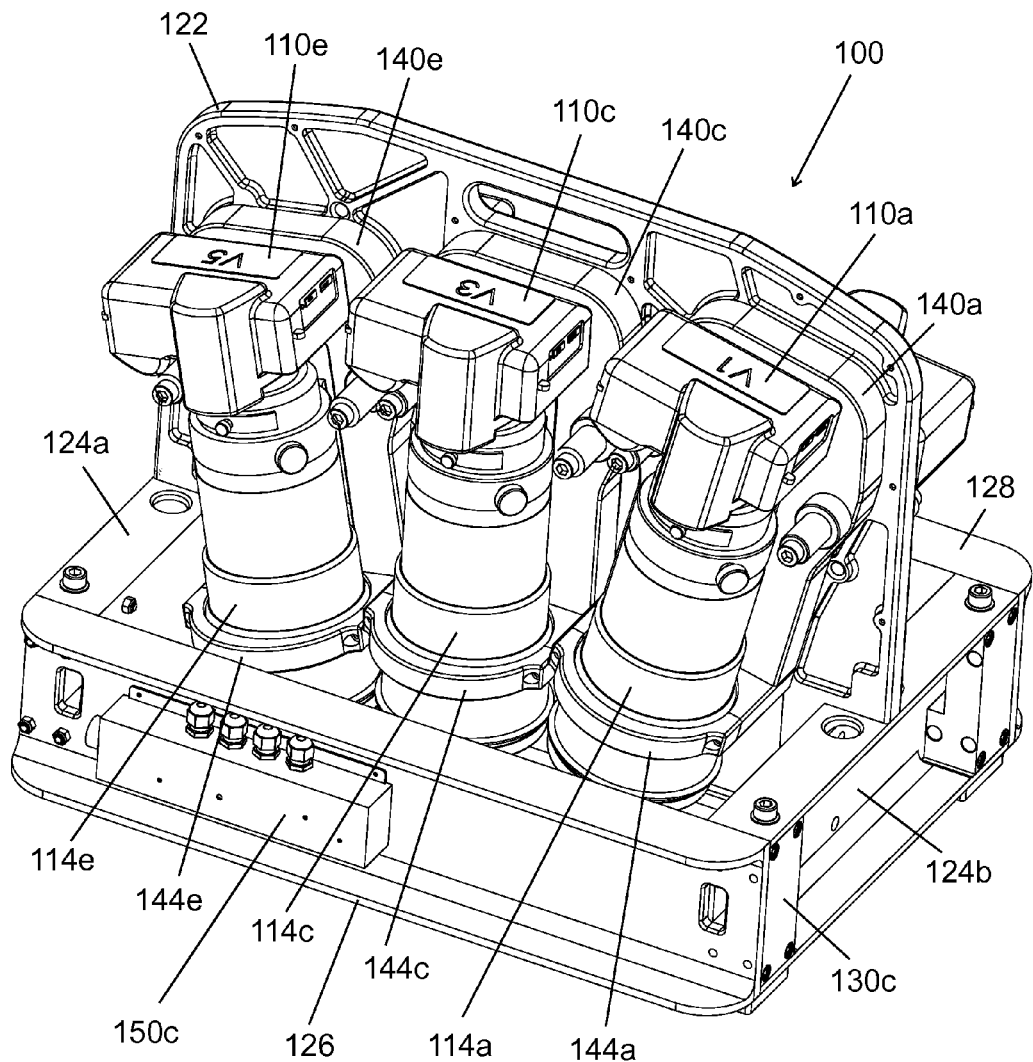
FIG. 2 shows a back view of the camera unit.
Figure 3:
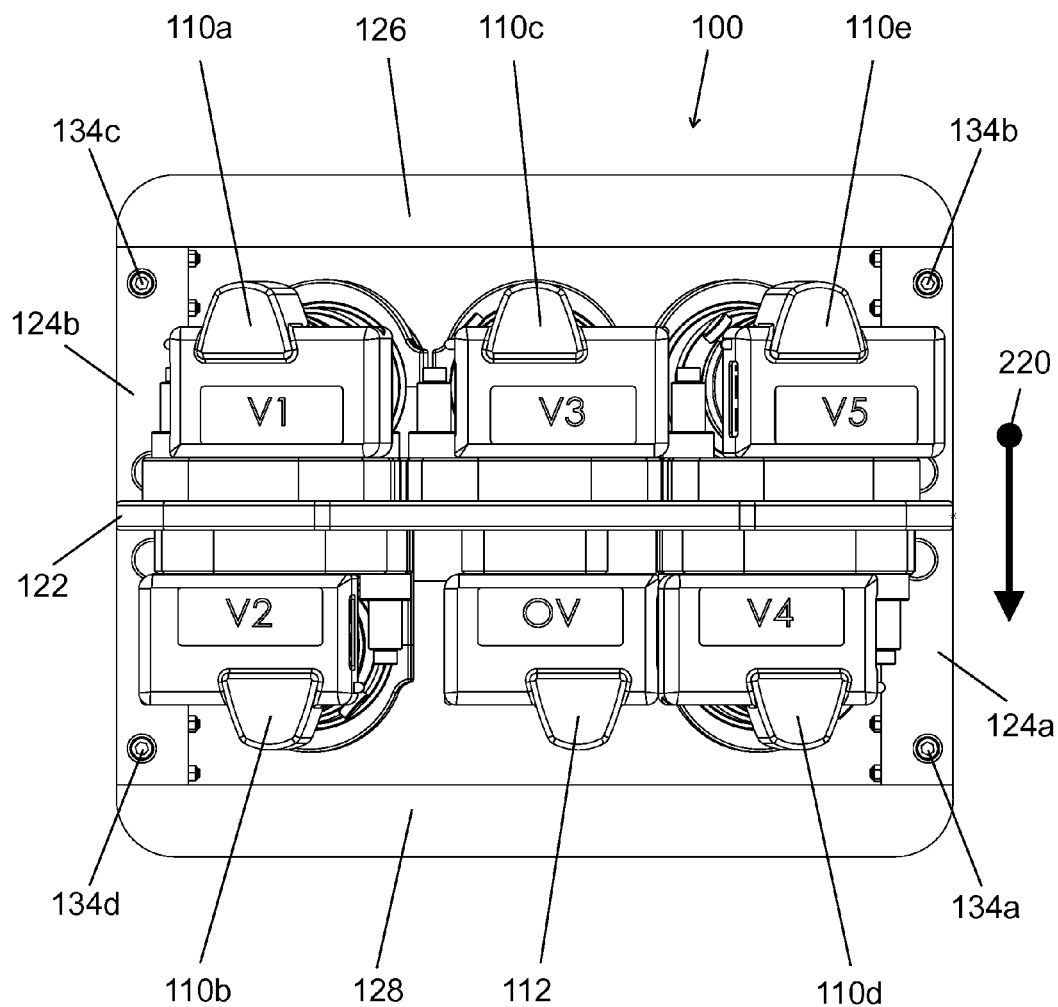
FIG. 3 shows a top view of the camera unit.
Figure 4:
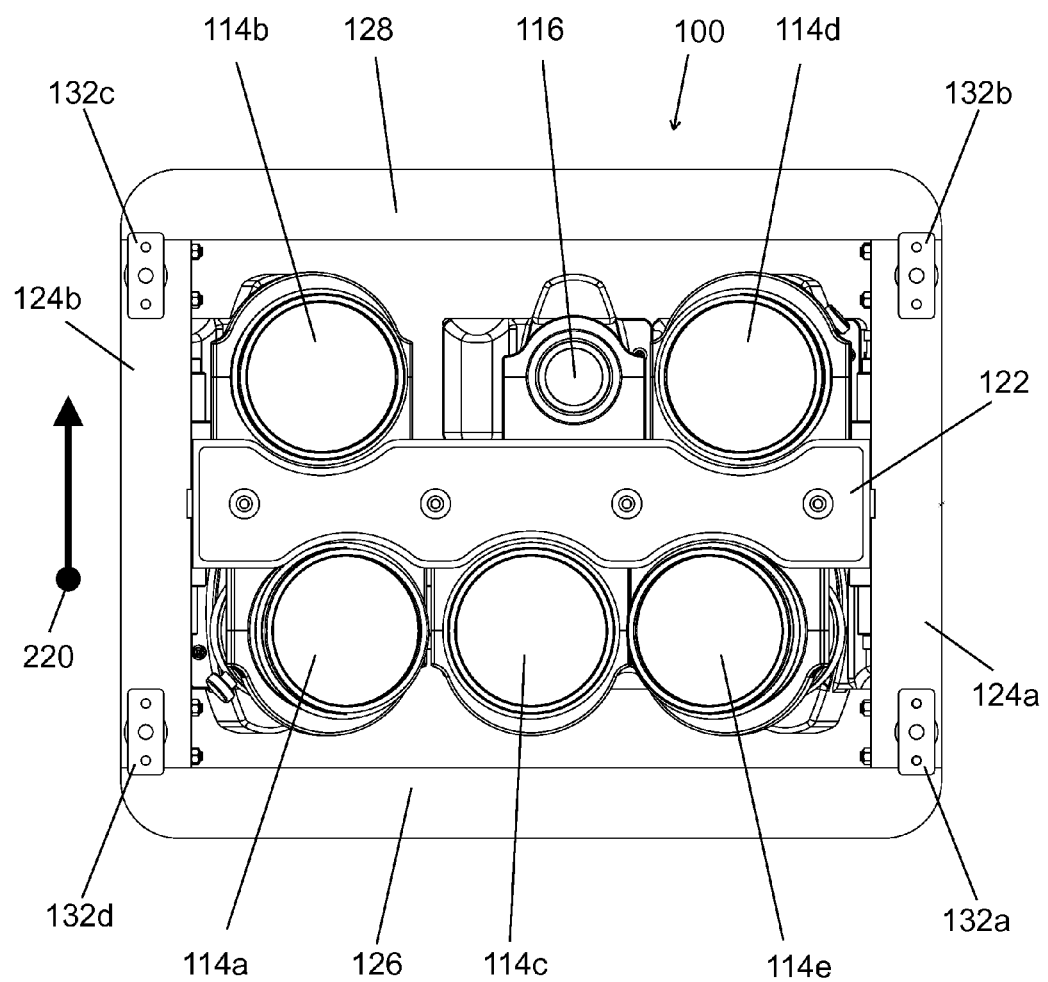
FIG. 4 shows a bottom view of the camera unit.
Figure 5:
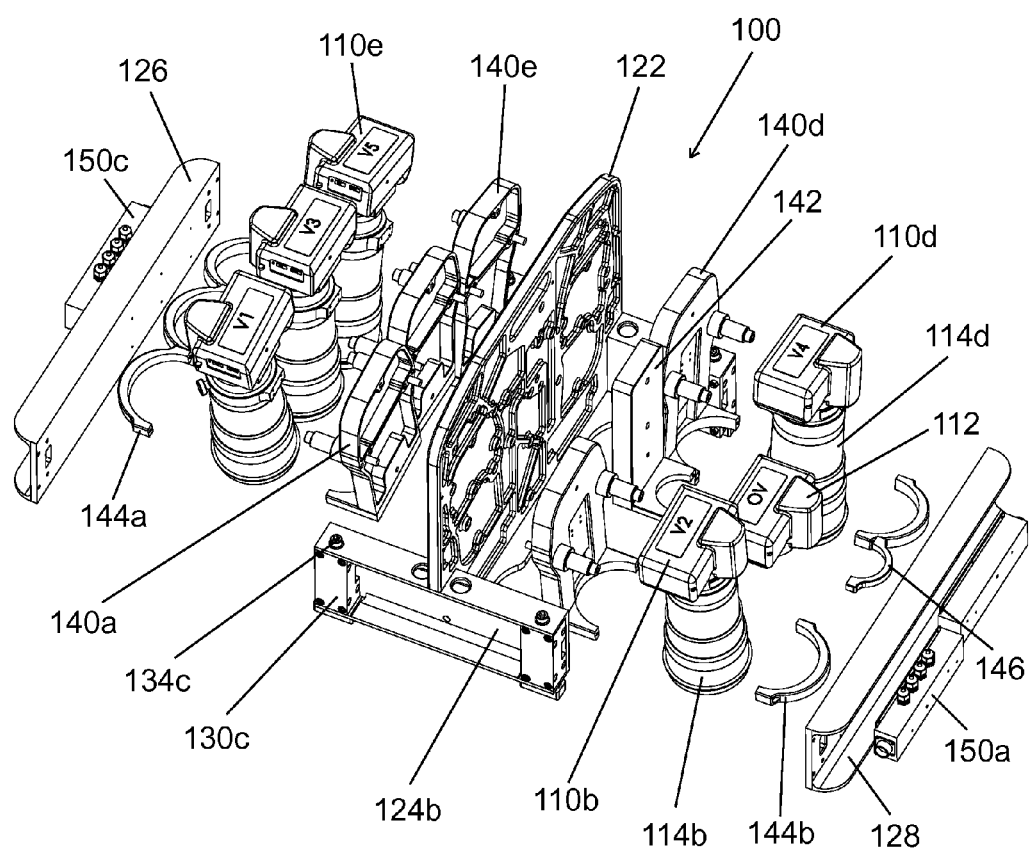
FIG. 5 shows an exploded view of the camera unit.

100 Camera unit.
110 Detail camera body.
112 Overview camera body.
114 Detail camera lens.
116 Overview camera lens.
118 Lens of special-purpose (e.g. NIR) camera.
120 Frame.
122 Frame center support.
124 Frame side support.
126 Frame rear support.
128 Frame front support.
130 Mount point block.
132 Mount point.
134 Mount bolt.
140 Mount for detail camera.
142 Mount for overview camera.
144 Clamp for detail camera lens.
146 Clamp for overview camera lens.
150 Power and control distribution box.
160 Detail field of view.
162 Lateral detail field of view.
164 Longitudinal detail field of view.
170 Overview field of view.
172 Lateral overview field of view.
174 Longitudinal overview field of view.
180 Aggregate detail field of view.
182 Lateral aggregate detail field of view.
190 Aggregate overview field of view.
192 Lateral aggregate overview field of view.
194 Nominal 30-degree field of view.
196 One-km grid.
200 Adapter plate.
202 Seat track fastener.
210 Aircraft floor.
212 Camera hole.
214 Seat track.
216 Adapter plate aperture.
220 Direction of flight.
222 Flight path.
224 Shot position.
230 Aerial survey aircraft.
232 Aerial survey aircraft belly-mounted pod.
250 Field of view angle (beta).
252 Focal length (f).
254 Altitude above ground level (a).
256 Image sensor width (s).
258 Swath width (w).
260 Image sensor pixel pitch (p).
262 Ground sampling distance (GSD) (g).
270 Aggregate field of view angle (gamma).
272 Angular camera overlap (omega).
278 Aggregate swath width (w(N)).
280 Camera tilt angle (theta).
282 Tilted camera GSD (g(theta)).
284 Tilted camera field of view.
286 Tilted camera with tilted focal plane GSD (h(theta)).
288 Tilted camera with tilted focal plane field of view.
300 Computer.
302 Pilot display.
304 Inertial Measurement Unit (IMU).
306 Global Navigation Satellite System (GNSS) receiver.
308 Analog-to-digital converters (ADCs).
310 Camera control unit (CCU).
320 Battery unit.
322 Aircraft auxiliary power.
324 Ground power unit (GPU).
326 DC-DC converters.
330 Angular motion compensation (AMC) unit(s).
400 Detail photos.
402 Overview photos.
404 Photomosaic.
410 Match features step.
412 Solve pose and positions step.
414 Orthorectify step.
416 Blend step.
510 Right oblique detail field of view.
512 Lateral right oblique detail field of view.
514 Longitudinal right oblique detail field of view.
520 Right oblique overview field of view.
522 Lateral right oblique overview field of view.
524 Longitudinal right oblique overview field of view.
530 Left oblique detail field of view.
532 Lateral left oblique detail field of view.
534 Longitudinal left oblique detail field of view.
540 Left oblique overview field of view.
542 Lateral left oblique overview field of view.
544 Longitudinal left oblique overview field of view.
550 Front oblique detail field of view.
552 Lateral front oblique detail field of view.
554 Longitudinal front oblique detail field of view.
560 Front oblique overview field of view.
562 Lateral front oblique overview field of view.
564 Longitudinal front oblique overview field of view.
570 Back oblique detail field of view.
572 Lateral back oblique detail field of view.
574 Longitudinal back oblique detail field of view.
580 Back oblique overview field of view.
582 Lateral back oblique overview field of view.
584 Longitudinal back oblique overview field of view.
600 Camera.
602 Camera optical axis.
604 Steerable multiplexing mirror.
606 Fixed mirror.
608 Steerable motion compensation mirror.

DETAILED DESCRIPTION OF PREFERRED EMBODIMENTS

HyperCamera™ is a range of multi-resolution aerial camera systems suitable for deployment in a wide range of aircraft, large and small. The camera systems are modular, and designed to be installed above one or more standard camera holes where appropriate, as are typically provided through the floor of a survey aircraft or airborne pod.

Each HyperCamera model is defined by its pointing direction (P), the number of cameras (N) in its array, and the focal length (f) of the cameras, and is identified by the designator PN-f. For example, a 300 mm five-camera vertical HyperCamera is referred to as a V5-300 model.

The level of detail captured by an aerial camera is typically characterized by the ground sampling distance (GSD), i.e. the distance between adjacent pixel centers when projected onto the ground within the camera's field of view.

Figure 42:
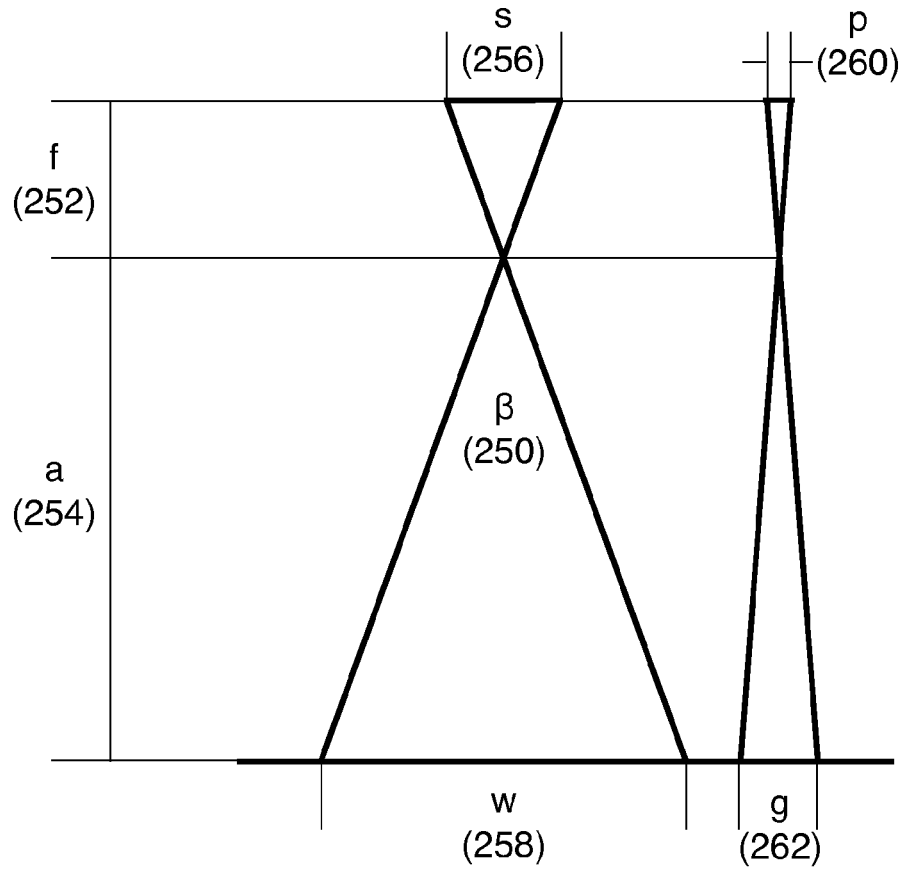
FIG. 42 shows a diagram and equation relating to the calculation of the field of view and resolution of a camera.

The GSD is determined by the focal length (252) of the camera lens, the altitude above ground level (254), and the pixel pitch (260) of the image sensor, per EQ 1 in FIG. 42.

The efficiency of aerial imaging is typically characterized by the area captured per unit time (e.g. square km per hour). This is proportional to the speed of the aircraft and the width of the field of view (FOV) of the aerial camera system, referred to as the swath width.

The swath width (258) of a single camera is determined by the focal length (252) of the camera lens, the altitude above ground level (254), and the lateral size (256) of the image sensor, per EQ 2 in FIG. 42. Doubling the altitude doubles the swath width.

The lateral field of view (250) of a single camera is determined by the focal length (252) of the camera lens and the lateral size (256) of the image sensor, per EQ 4 in FIG. 42. Doubling the focal length approximately halves the field of view.

Figure 43:
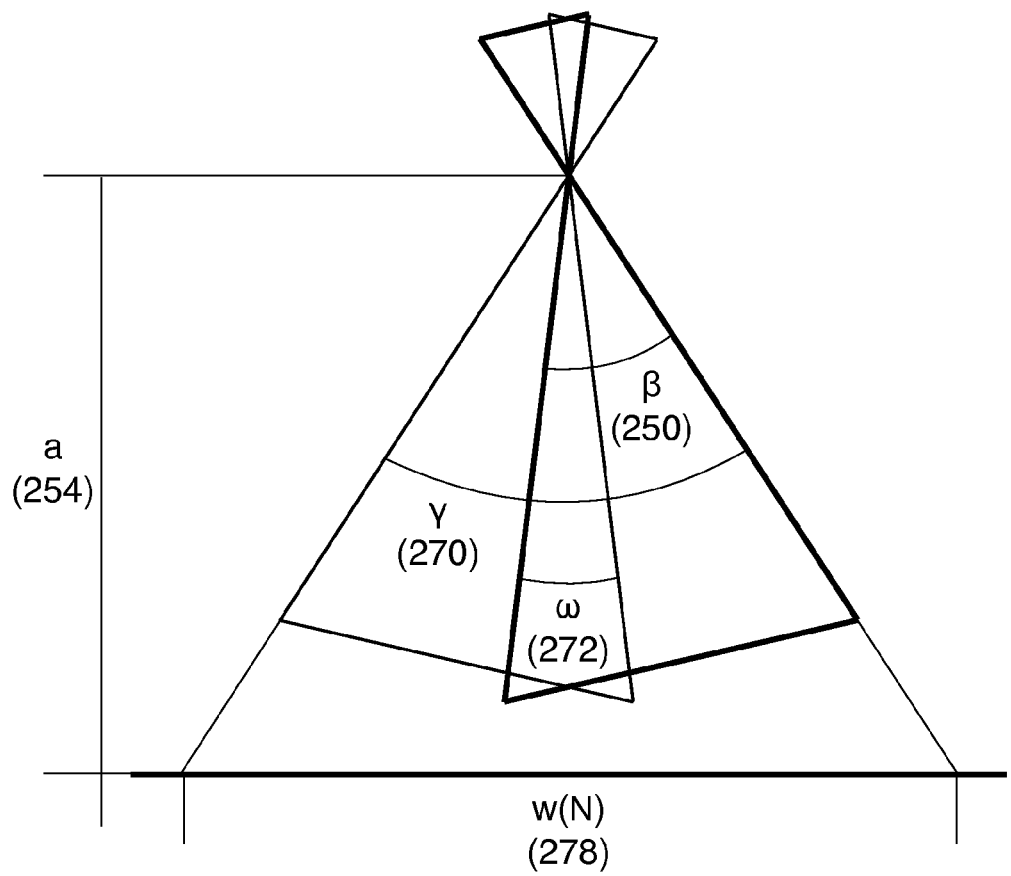
FIG. 43 shows a diagram and equations relating to the calculation of the field of view of an array of cameras.

The lateral field of view (270) of an array of cameras is determined by the field of view of each camera (250), the number of cameras, and their angular overlap (272), per EQ 7 in FIG. 43. Doubling the number of cameras approximately doubles the field of view. The swath width (278) of the array of cameras is given by EQ 8 in FIG. 43.

The practical field of view of an aerial camera system is limited by the acceptable level of obliqueness in the aerial imagery—e.g. how much buildings are allowed to lean when captured at the edge of the field of view. The practical field of view is usually limited to 50 degrees or less.

Given a limit on the practical field of view, higher capture efficiency (and therefore lower capture cost) can be achieved by flying at higher speed and/or at a higher altitude. Flying at a higher altitude requires longer focal lengths to maintain the same GSD. Since each camera then has a narrower individual field of view, this in turn requires a larger number of cameras to maintain the overall field of view.

The HyperCamera range includes models suited to a variety of operating altitudes, and supporting a range of GSDs and capture efficiencies. Depending on target speed and altitude, a HyperCamera system may be installed in any aircraft suitable for aerial imaging. By way of example, this includes (but is not limited to) piston aircraft such as a Cessna 210, turboprop aircraft such as a Cessna 208, and turbofan (jet) aircraft such as a Cessna Citation, allowing aerial imaging from low altitudes to altitudes in excess of 40,000 feet, at speeds ranging from less than 100 knots to 400 knots.

The aircraft may be unpressurised or pressurised, and each camera hole may be open or contain an optical glass window as appropriate. Each camera hole may be optionally protected by a door which can be closed when the HyperCamera is not in operation.

In a preferred embodiment, as illustrated in FIGS. 1 through 5, a V5-300 HyperCamera comprises a camera unit 100 incorporating five detail cameras 110 and a relatively wider-angle overview camera 112. Each detail camera 110 has a detail lens 114, and the overview camera 112 has a overview lens 116.

The overview lens 116 is characterised by having a significantly wider angle than the detail lens 114. While it may be a true wide-angle lens, it may also be a normal lens or even a telephoto lens so long as it is significantly wider than the detail lens 114. Likewise, while the detail lens 114 may be a true telephoto lens, it may also be a normal lens or even a wide-angle lens so long as it is significantly narrower than the overview lens 116.

The cameras 110 and 112 are preferably commercial off-the-shelf (COTS) digital SLR (DSLR) cameras. The use of COTS cameras allows the system to be readily adapted to the latest and best available cameras. Alternatively or additionally, to provide imaging features not available in COTS cameras, such as non-mosaiced RGB imaging, multi-spectral imaging, and forward motion compensation, dedicated camera designs may also be utilised.

High-resolution COTS cameras are available with typical pixel counts ranging from 24 Mpixels to 36 Mpixels, from vendors such as Nikon and Canon. The 36 Mpixel Nikon D800 DSLR camera is a particularly good choice for the present system.

DSLR cameras offer a wide range of high-quality lenses, allowing the system to be readily configured to operate at different altitudes and resolutions.

The system is readily adapted to a mixture of cameras. For example, a relatively more expensive camera with a higher pixel count may be employed as the overview camera. 70 Mpixel DSLR cameras are expected to be available in the near future, and a 70 Mpixel camera would be a good choice for the overview camera.

In the preferred embodiment the detail lenses 114 of the detail cameras 110 all have the same focal length, and the detail cameras 110 all have the same pixel size. Thus the camera unit 100 embodies two distinct camera resolutions—overview and detail. This is readily extended to multiple resolutions greater than two through the use detail lenses 114 with different focal lengths, and/or the use of detail cameras 110 with different pixel sizes. The camera unit 100 may also incorporate multiple overview cameras with different resolutions.

Each detail lens 114 and overview lens 116 may be a fixed-focus lens focused at infinity or a variable-focus lens. In the latter case the corresponding camera 110 and/or 112 incorporates an auto-focus mechanism.

Each detail camera 110 is bolted to a camera mount 140, which in turn is bolted to a center support 122. Each detail camera lens 114 is further secured by a clamp 144 which is bolted to the detail camera mount 140.

The overview camera is bolted to a camera mount 142, which in turn is bolted to the center support 122. The overview camera lens 116 is further secured by a clamp 146 which is bolted to the overview camera mount 142.

The camera mounts 140 and 142 isolate much of the structure of camera unit 100 from the specifics of individual camera models and lens sizes.

The center support 122 is attached to a pair of side supports 124a and 124b, and each side support 124 is in turn attached to a rear support 126 and a front support 128 to form a rigid frame 120.

Each side support 124 is attached to mount point block 130 via a set of four bolts, and the mount point block 130 is in turn attached to the rear support 126 or front support 128, as appropriate, via a further set of four bolts. The mount point blocks 130 thereby provide the attachment mechanism between the side supports 124 and the rear and front supports 126 and 128.

Each of the side supports 124 and the rear and front supports 126 and 128 has a C-shaped cross-sectional profile to minimise weight while maximising rigidity, while the center support 122 is pocketed to minimise weight while maximising rigidity.

Each mount point block 130 is solid, and serves the additional purpose of providing a point of attachment between the camera unit 100 and a survey aircraft, as described below.

All parts are made from light-weight aluminium, except for fasteners which are made from steel.

The rear support 126 and the front support 128 hold three power and control distribution boxes 150. Each box 150 distributes power and control signals to a pair of cameras. For clarity, the power and control cabling between the boxes 150 and the cameras 110 and 112 is omitted in the figures.

In the preferred embodiment each detail camera 110 has a lens 114 with a focal length of 300 mm suitable for high-resolution imaging at relatively high altitudes. For example, when using a 36 Mpixel Nikon D800 camera (which has 4.88 um pixels), a 300 mm lens allows a ground sampling distance (GSD) of 30 cm at 60,000 feet, 20 cm at 40,000 feet, 10 cm at 20,000 feet, 8 cm at 16,000 feet, 6 cm at 12,000 feet, 4 cm at 8,000 feet, 2 cm at 4,000 feet, 1 cm at 2,000 feet, etc.

Assuming the detail cameras 110 and overview camera 112 have similar pixel counts and pixel sizes, the overview camera 112 ideally has a lens 116 with a focal length that is between 4 and 8 times shorter than the focal length of the detail lens 114, as discussed further below. I.e. for a 300 mm detail lens 114, suitable focal lengths for the overview lens 116 range from about 40 mm to 75 mm. For illustrative purposes the present system utilises a 50 mm overview lens 116.

Figure 6:
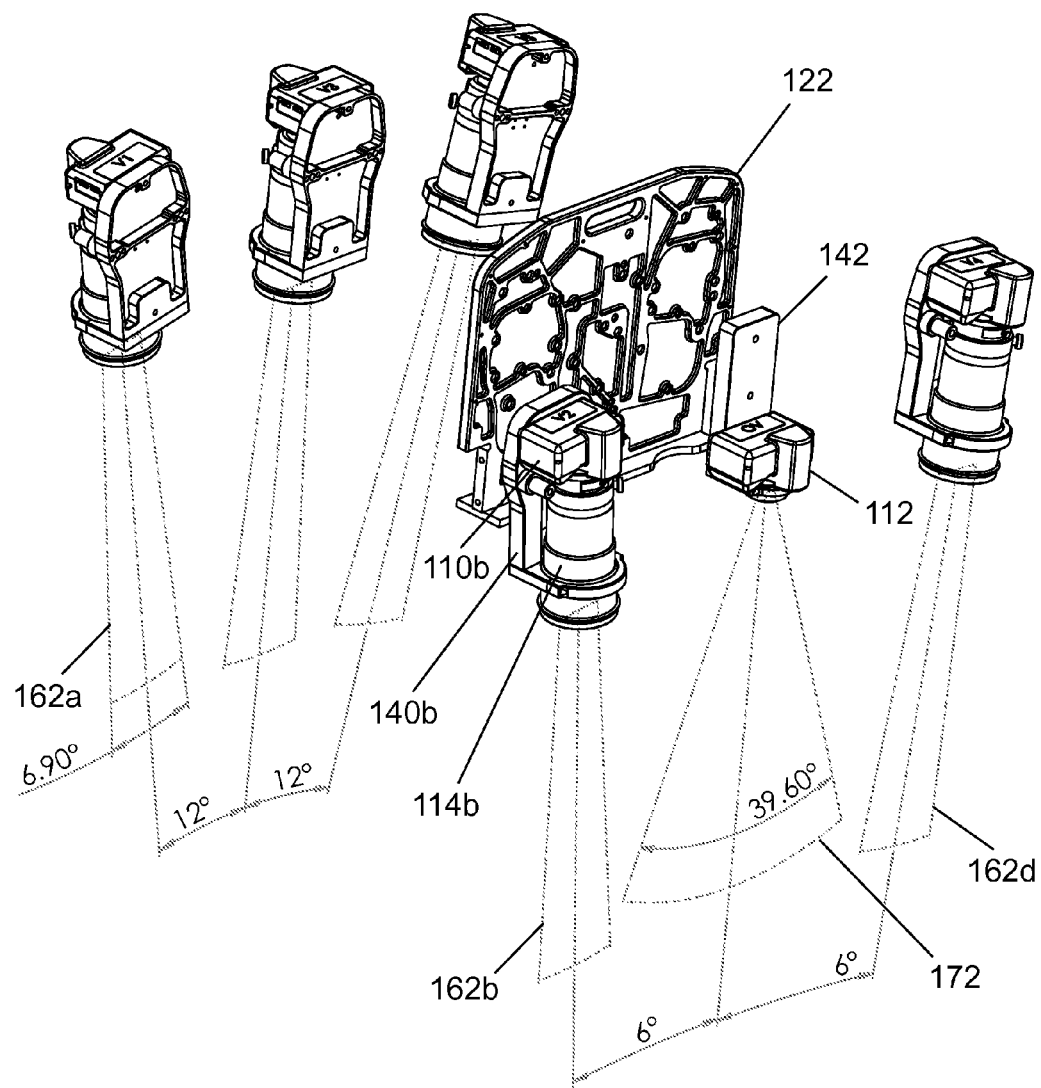
FIG. 6 shows an exploded view of the cameras and the central support of the camera unit, with the field of view of each camera.

FIG. 6 shows the 6.90-degree lateral field of view 162 of each of the five detail cameras 110 with 300 mm lenses 114, and the 39.60-degree lateral field of the overview camera 112 with a 50 mm lens 116.

In this specification, the lateral direction is the direction perpendicular to the direction of flight 220, and the longitudinal direction is the direction parallel to the direction of flight 220.

As shown, the detail cameras are angled 6 degrees apart laterally, i.e. slightly less than their 6.90-degree fields of view 162, so that the fields of view 162 overlap slightly.

Using 36 Mpixel Nikon D800 cameras, the five detail cameras 110 have an aggregate field of view with a pixel count of approximately 160 Mpixels, i.e. excluding overlap.

Stock telephoto lenses suitable for use as detail lenses 114 are available in a variety of focal lengths, typically including 85 mm, 105 mm, 135 mm, 180 mm, 200 mm, 300 mm, 400 mm, 500 mm, 600 mm, 700 mm, and 800 mm.

At 20,000 feet a 400 mm lens on a Nikon D800 camera allows a GSD of 7.4 cm, a 600 mm lens a GSD of 5.0 cm, and an 800 mm lens a GSD of 3.7 cm.

Stock normal and wide-angle lenses suitable for use as an overview lens 116 are available in a variety of focal lengths, typically including 10.5 mm, 14 mm, 16 mm, 18 mm, 20 mm, 21 mm, 24 mm, 28 mm, 35 mm, 40 mm, 45 mm, 50 mm, 55 mm, 60 mm and 70 mm.

The camera unit 100 is readily adapted for different models and sizes of cameras 110 (and 112) and lenses 114 (and 116) via different camera mounts 140 (and 142) and clamps 144 (and 146). For extremely long lenses a taller center support 122 can be used.

Figure 7:
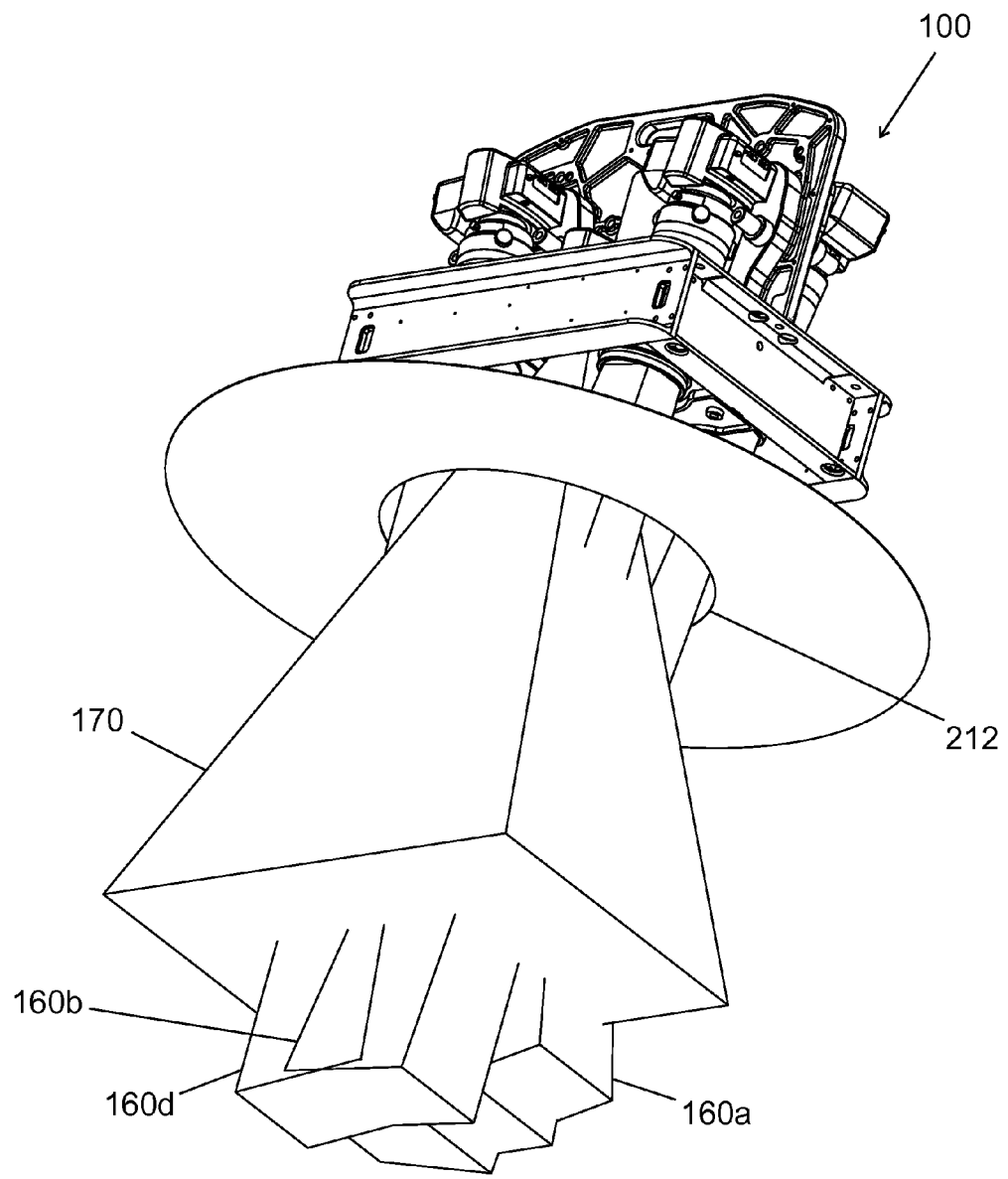
FIG. 7 shows the camera unit from below, with its combined fields of view passing through the aperture of an aircraft camera hole.

As shown in FIG. 6 and FIG. 7, the detail cameras are angled inwards so that their fields of view 162 cross over directly below the camera unit 100, creating a waist of minimum diameter where the fields of view pass through the camera hole 212. This makes the camera unit 100 compatible with standard 20-inch camera holes, as well as camera holes as small as about 17 inches.

Figure 8:
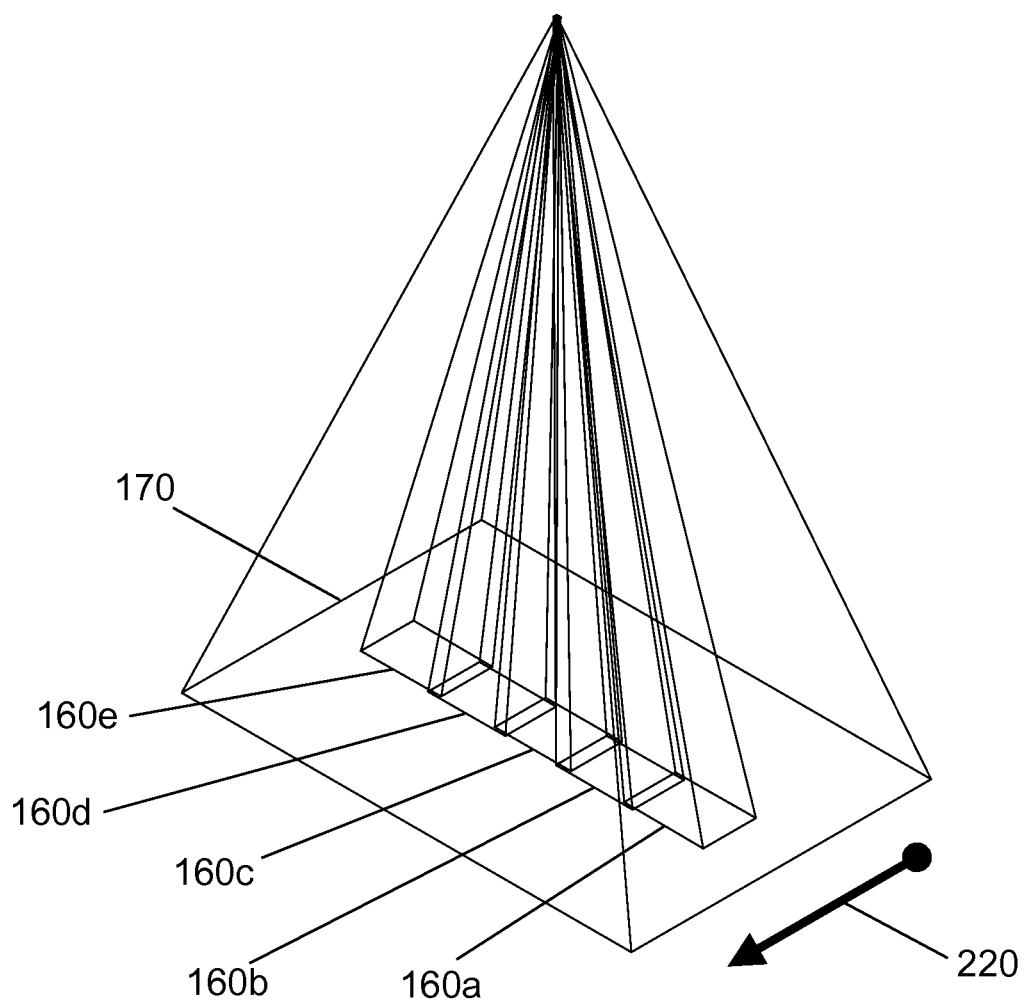
FIG. 8 shows the overview field of view and the five overlapping detail fields of view of the camera unit.

FIG. 8 shows the projection of the three-dimensional fields of view 160 and 170 of the detail cameras 110 and overview camera 112 onto a ground plane. It shows how the detail field of views 160 overlap in a direction perpendicular to the direction of flight 220.

Figure 9:
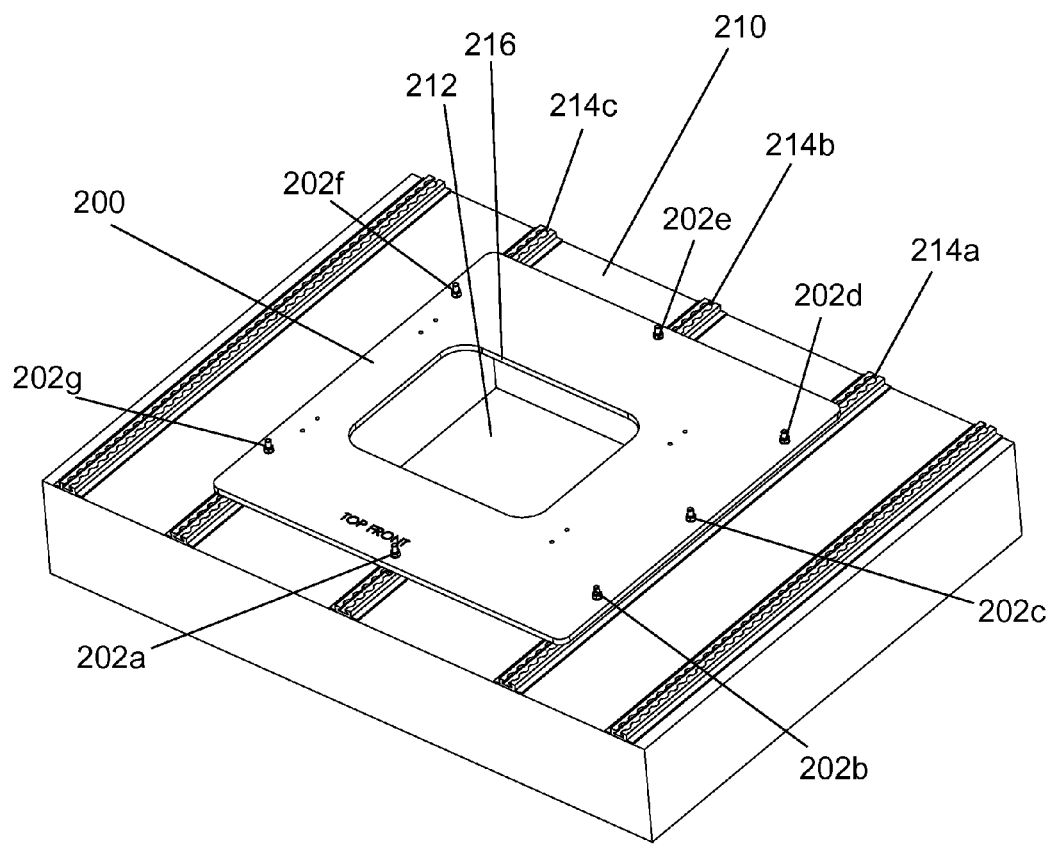
FIG. 9 shows the adapter plate of the HyperCamera mounted on seat tracks on the floor of an aircraft.

FIG. 9 shows an adapter plate 200 that attaches to the seat tracks 214 of an aircraft, a Cessna 208 in this case, via standard seat track fasteners 202. The adapter plate has an aperture 216 which exposes a camera hole 212 through the floor 210 of the aircraft.

Figure 10:
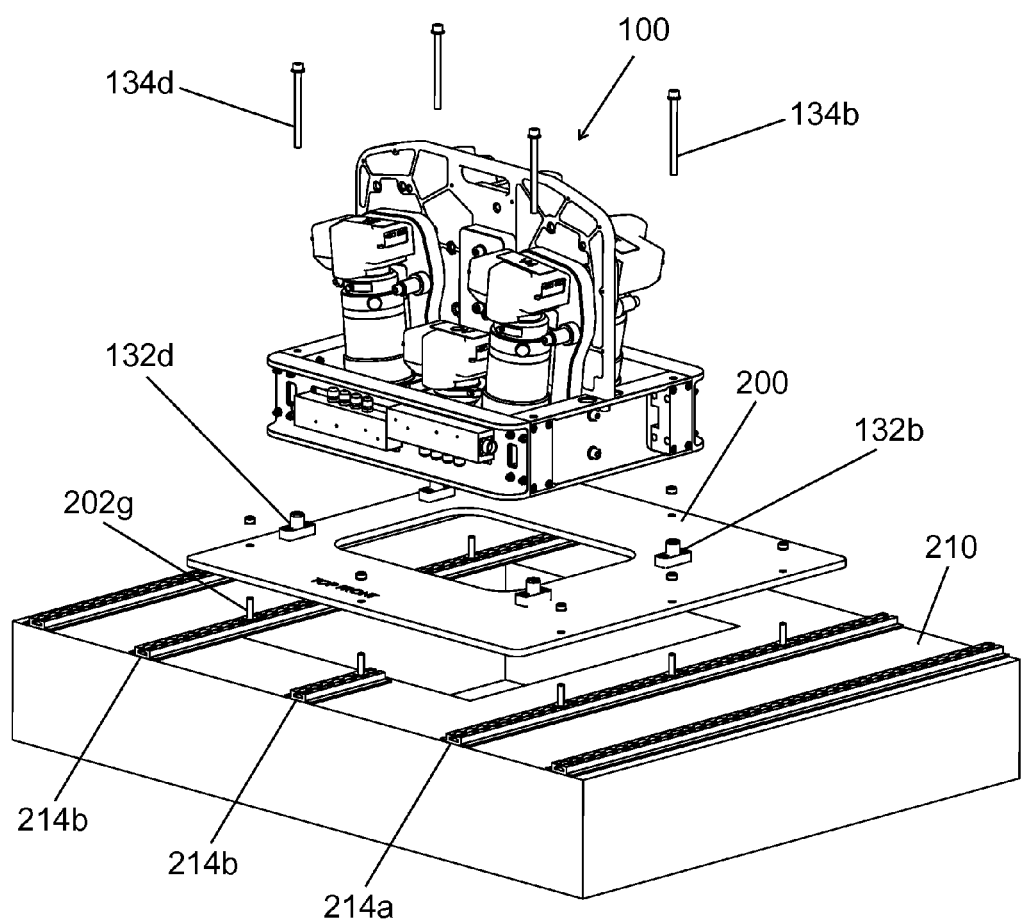
FIG. 10 shows an exploded view of the camera unit, the adapter plate, and seat tracks on the floor of an aircraft.

FIG. 10 shows an exploded view of the camera unit 100, adapter plate 200, and the aircraft floor 210. The adapter plate 200 is designed to attach the camera unit 100 to a particular aircraft, and isolates the design of the camera unit 100 from aircraft specifics. A different adapter plate is designed for each aircraft attachment variation, e.g. due to different seat track spacings, or because the aircraft's camera hole installation includes its own mounting points.

Four mount points 132 are bolted to the adapter plate, with each mount point 132 mating with a recess in the base of its corresponding mount point block 134. A mount bolt 143 securely attaches each mount point block 134 to its corresponding mount point 132, thus attaching the camera unit 100 to the adapter plate 200.

The adapter plate 200 allows the camera unit 100 to be easily installed in and subsequently removed from an aircraft via installation and removal of the four mount bolts 143. The adapter plate 200 is itself generally easily installed in and removed from an aircraft, requiring no modification to the aircraft (assuming a suitable camera hole is already installed). The installation of external camera pod is generally a much more complicated operation.

Figure 11:
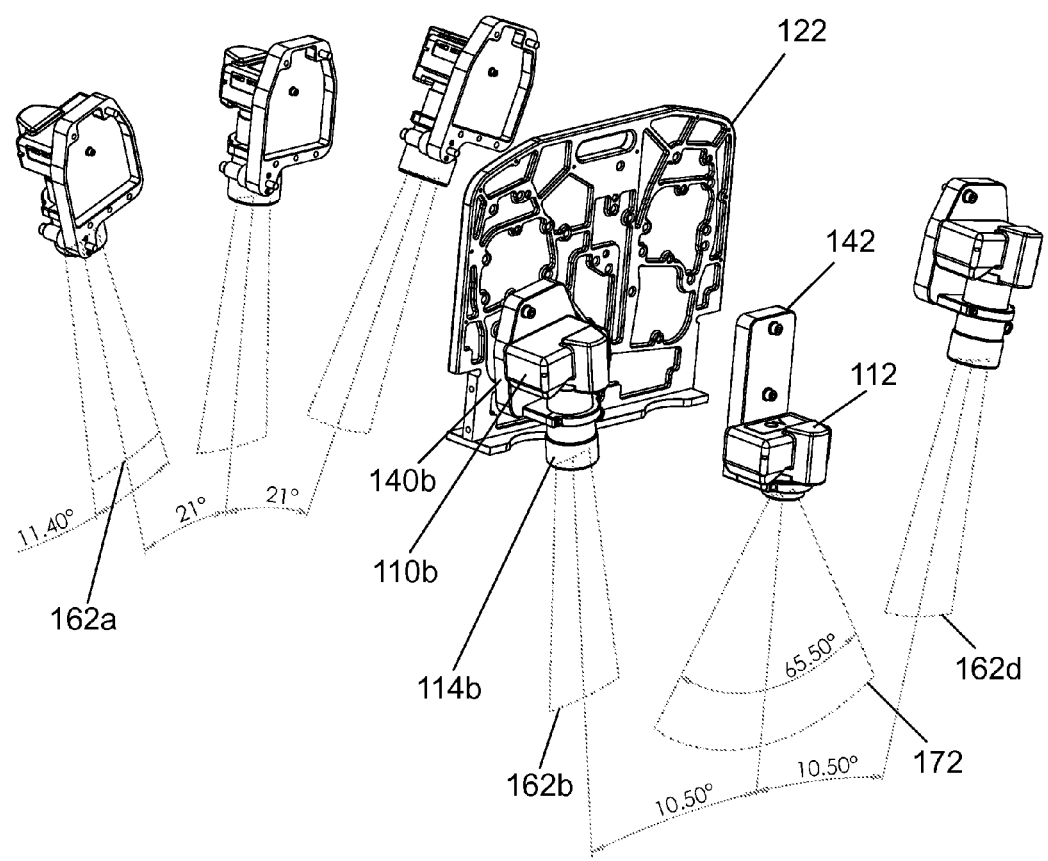
FIG. 11 shows an exploded view of the cameras and the central support of a wider-angle version of the camera unit.

FIG. 11 shows a V5-180 HyperCamera unit 100 that utilises shorter 180 mm lenses 114 for the detail cameras 110, and a matching 28 mm lens 116 for the overview camera 112.

When using a 36 Mpixel Nikon D800 camera (which has 4.88 um pixels), a 180 mm lens allows a ground sampling distance (GSD) of 9.9 cm at 12,000 feet, 8.3 cm at 10,000 feet, 6.6 cm at 8,000 feet, 5 cm at 6,000 feet, 3.3 cm at 4,000 feet, and so on.

FIG. 11 shows the 11.40-degree lateral field of view 162 of each of the five detail cameras 110 with 180 mm lenses 114, and the 65.50-degree lateral field of the overview camera 112 with a 28 mm lens 116.

As shown, the detail cameras are angled 10.50 degrees apart laterally, i.e. slightly less than their 11.40-degree fields of view 162, so that the fields of view 162 overlap slightly.

Figure 12:
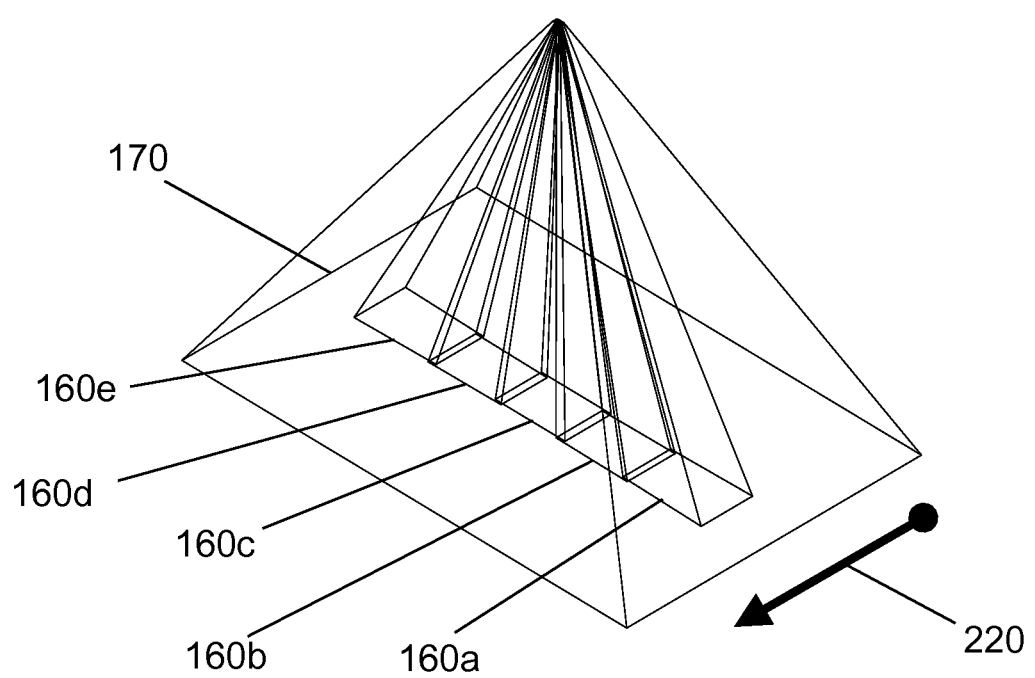
FIG. 12 shows the overview field of view and the five overlapping detail fields of view of the V5-180 HyperCamera unit.

FIG. 12 shows the projection of the three-dimensional fields of view 160 and 170 of the detail cameras 110 and overview camera 112 of FIG. 10 onto a ground plane. It shows how the detail field of views 160 overlap in a direction perpendicular to the direction of flight 220, and how the wider fields of view associated with the shorter lenses leads to a lower flying altitude for the same footprint on the ground, i.e. in comparison to FIG. 8.

Figure 13:
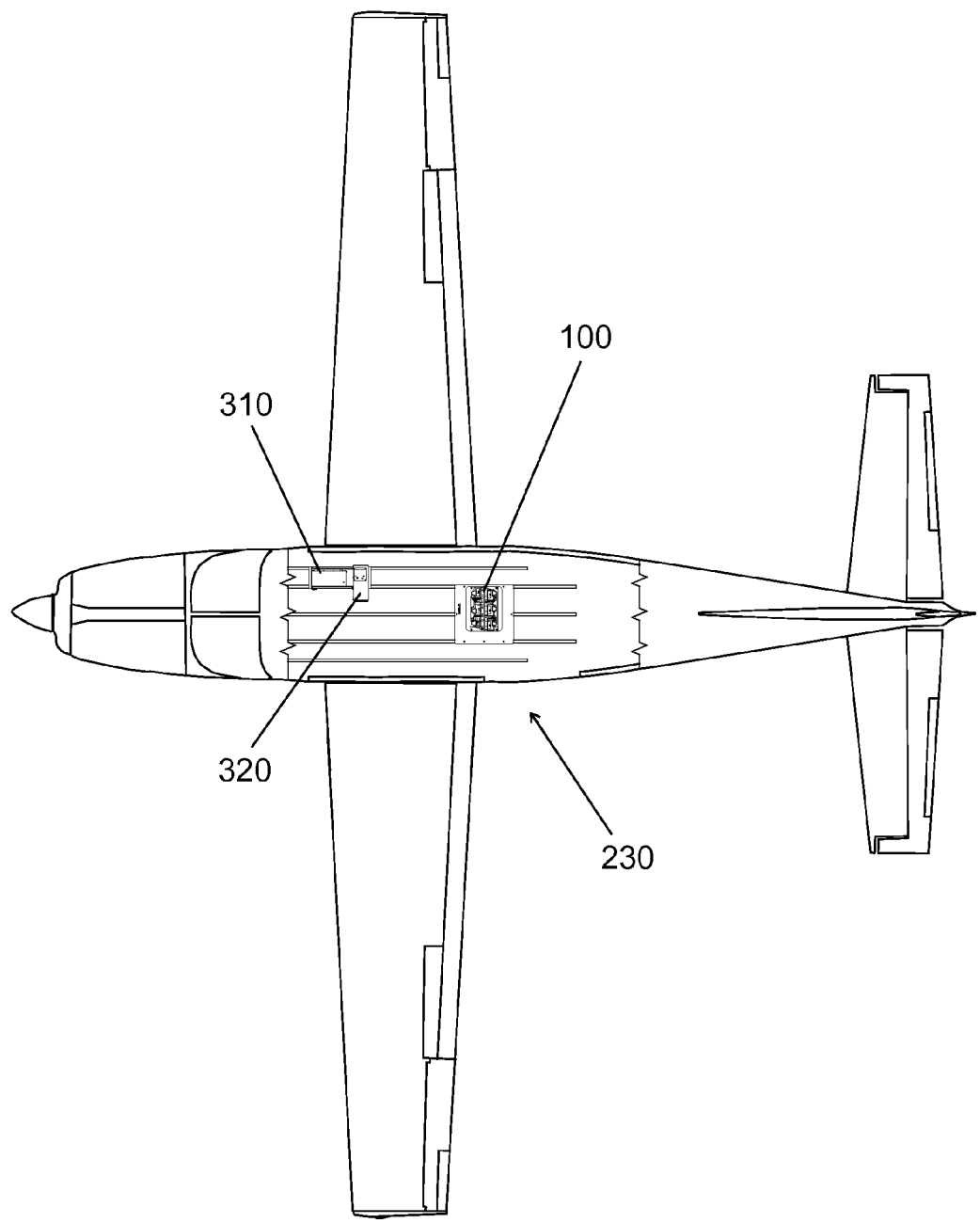
FIG. 13 shows a plan view of the HyperCamera installed in a Cessna 208 aircraft.
Figure 14:
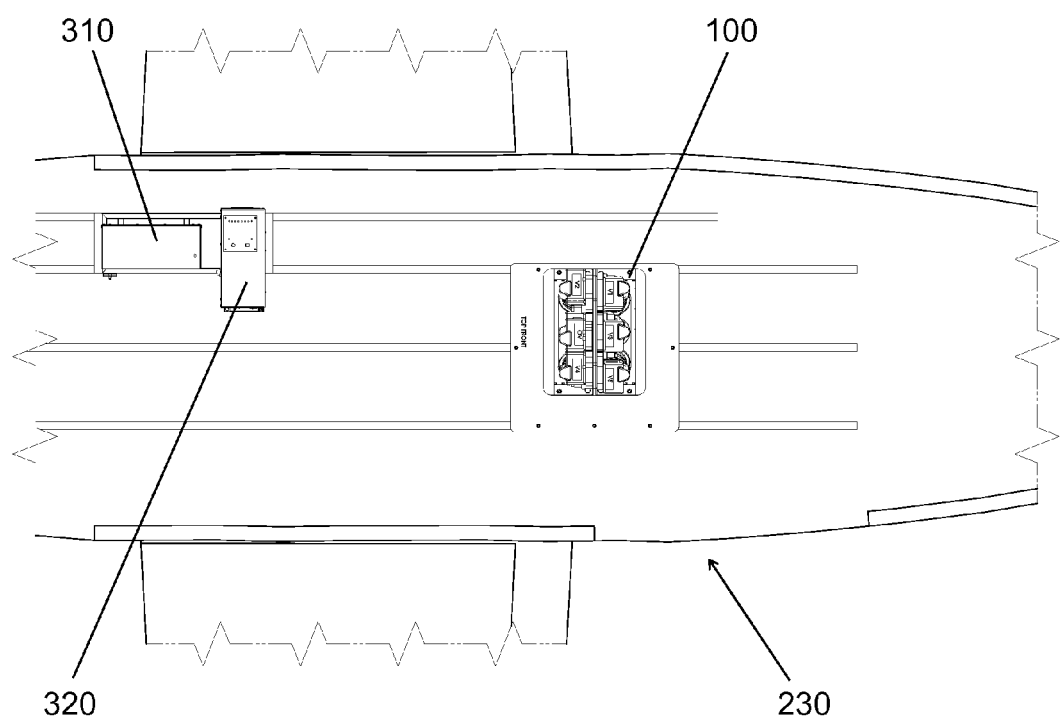
FIG. 14 shows a detailed plan view of the V5-300 HyperCamera installed in a Cessna 208 aircraft.

FIG. 13 and FIG. 14 show plan views of a Cessna 208 survey aircraft 230 carrying a camera unit 100 installed centrally over a camera hole. The figures also show a camera control unit 310 (CCU) and battery unit 320 used to control and power the camera unit 100. These are described in more detail below. For clarity, the cabling connecting the CCU 310, battery unit 320 and camera unit 100 is omitted.

Figure 15:
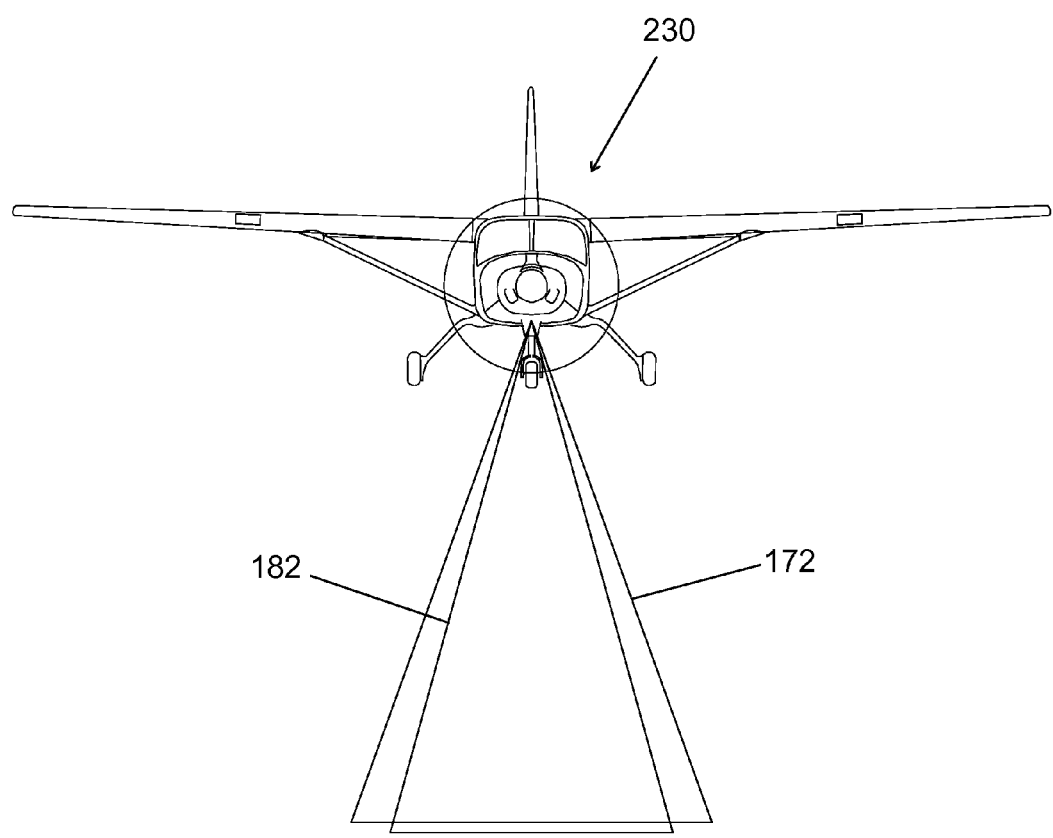
FIG. 15 shows a front elevation of a Cessna 208 aircraft carrying a V5-300 HyperCamera, and the resultant overview and aggregate detail fields of view.

FIG. 15 shows a front elevation of the Cessna 208 survey aircraft 230 carrying a HyperCamera, and shows the lateral overview field of view 172 of the camera unit 100, and the aggregate lateral detail field of view 182 of the camera unit 100. The aggregate lateral detail field of view 182 is the aggregate of the five individual overlapping lateral detail fields of view 162.

Figure 16:
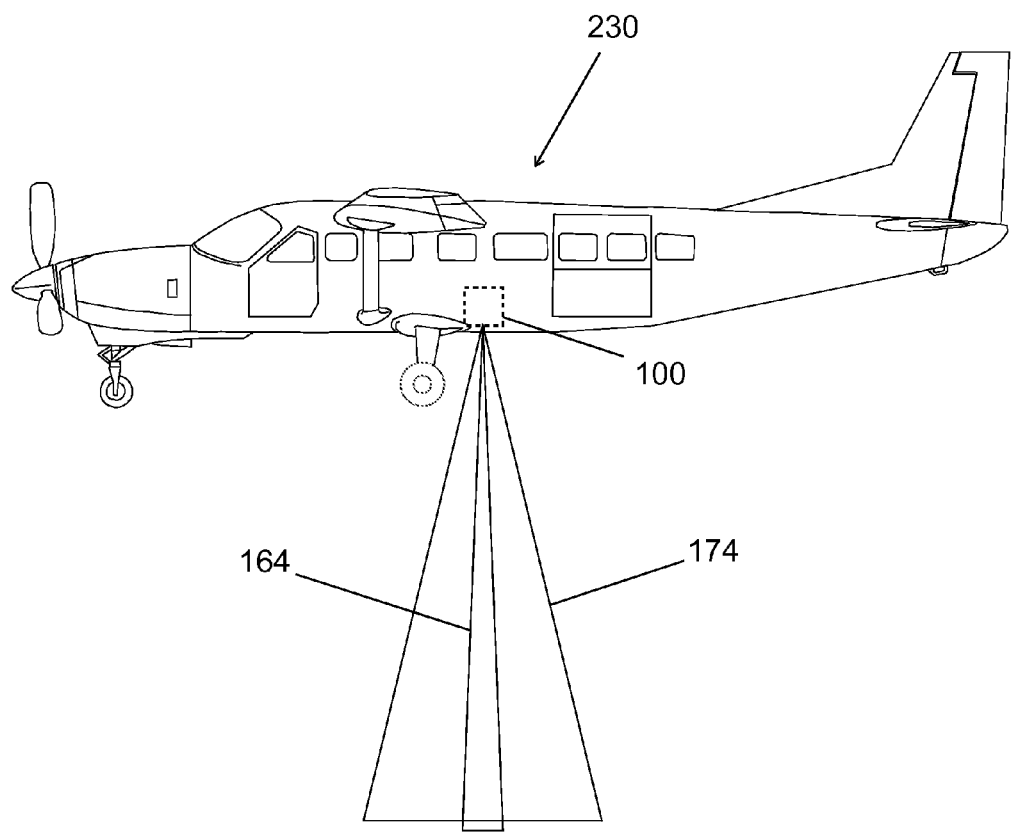
FIG. 16 shows a side elevation of a Cessna 208 aircraft carrying a V5-300 HyperCamera, and the resultant overview and aggregate detail fields of view.

FIG. 16 shows a side elevation of the Cessna 208 survey aircraft 230 carrying a HyperCamera, and shows the longitudinal overview field of view 174 of the camera unit 100, and the longitudinal detail field of view 164 of the camera unit 100.

Figure 17:
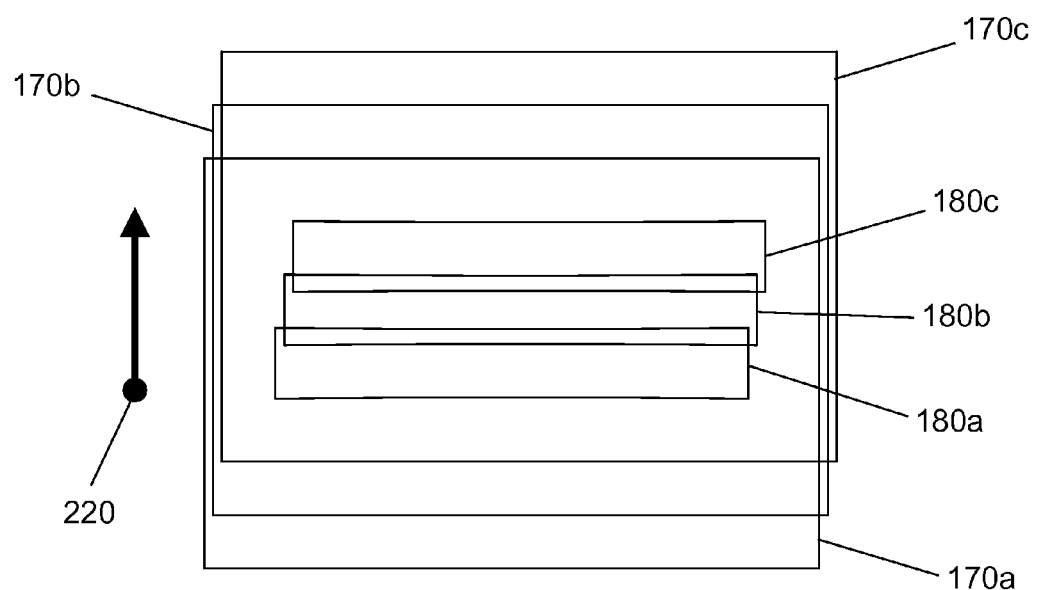
FIG. 17 shows the overlapping fields of view of three successive shots.

FIG. 17 shows the overlapping overview fields of view 170 and aggregate detail fields of view 180 of three successive shots in the direction of flight 220. The aggregate detail field of view 180 is the aggregate of the five individual overlapping detail fields of view 160. At the camera firing rate illustrated in the figure (i.e. as implied by the longitudinal overlap), the aggregate detail fields of view 180 overlap by about 20% longitudinally, while the overview fields of view 170 overlap by about 85% longitudinally.

Figure 18:
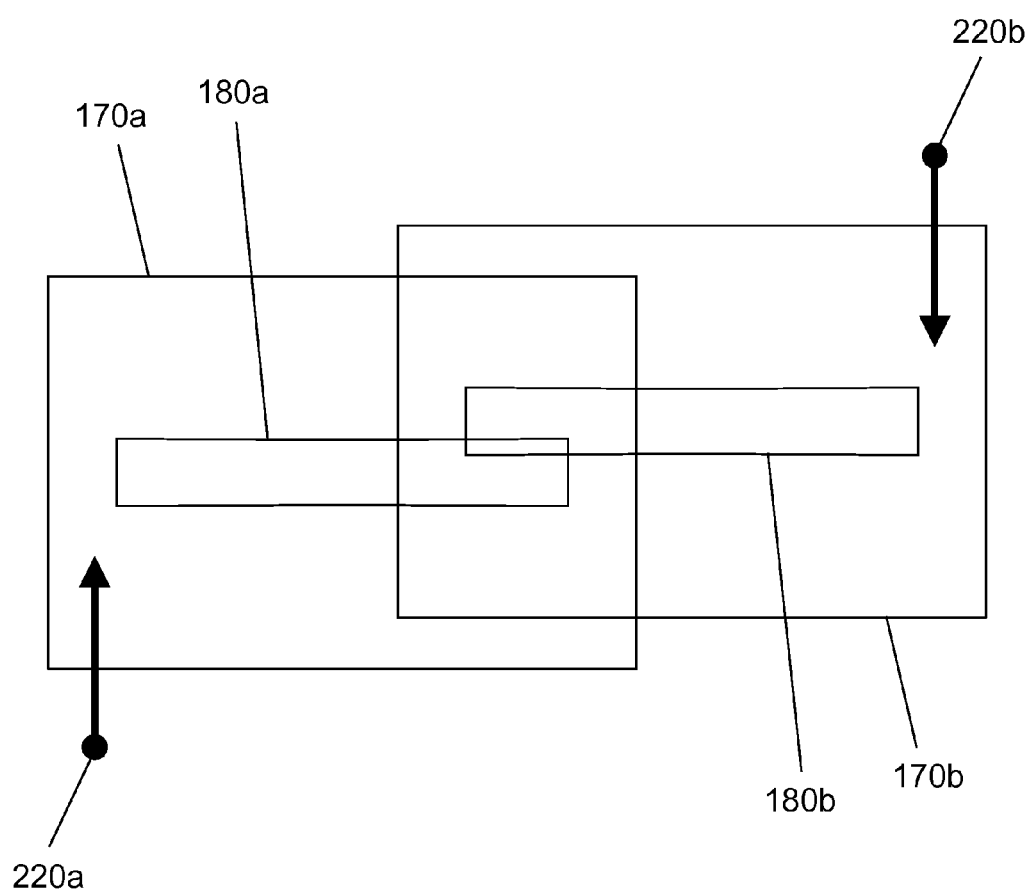
FIG. 18 shows the overlapping fields of view of shots in adjacent flight lines.

FIG. 18 shows the overlapping overview fields of view 170 and aggregate detail fields of view 180 of two shots from adjacent flight lines, i.e. flown in opposite directions 220. At the flight-line spacing illustrated in the figure, the aggregate detail fields of view 180 overlap by between 20% and 25% laterally, while the overview fields of view 170 overlap by about 40% laterally.

Assuming the detail cameras 110 and the overview camera 112 have similar pixel counts and pixel sizes, the size of the lateral overview field of view 172 and the size of the lateral aggregate detail field of view 182 are similar when the ratio of the focal length of the detail camera lens 114 to the focal length of the overview camera lens 116 is about 6, and useful lens combinations can be chosen with focal length ratios between about 4 and 8.

Figure 19:
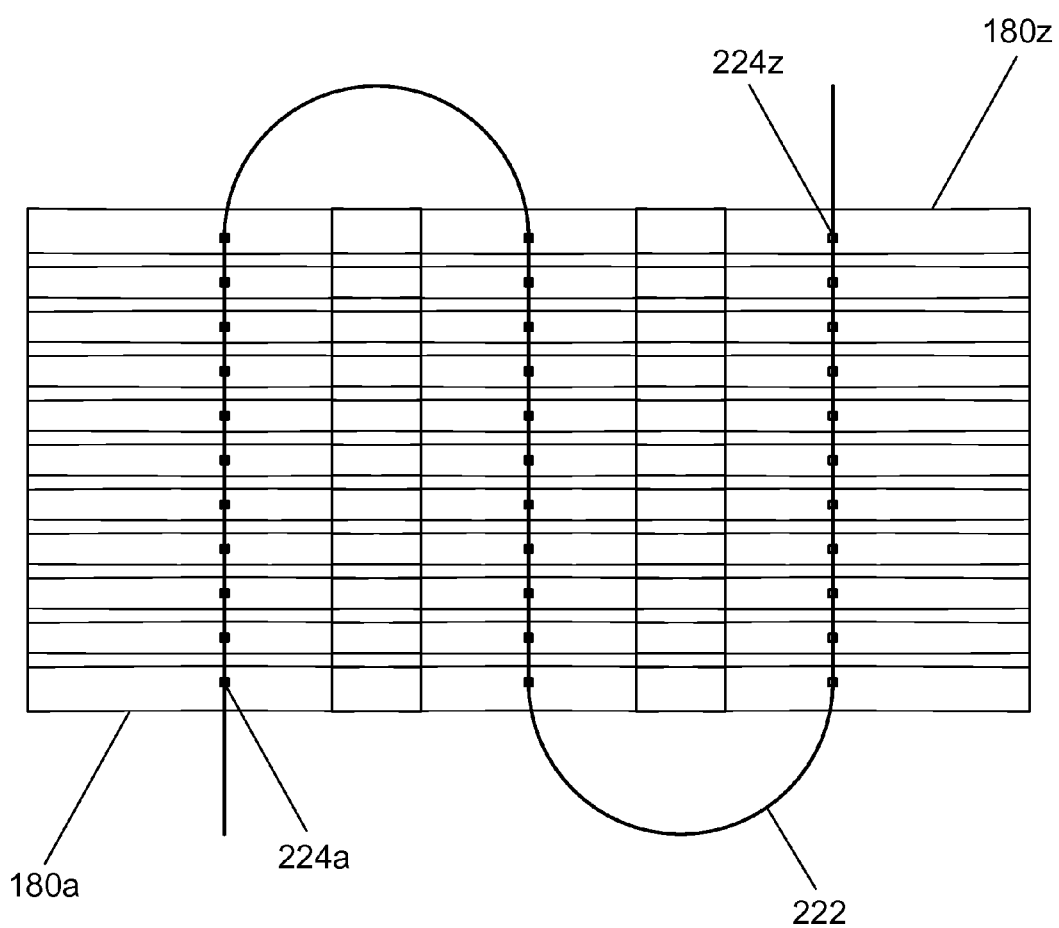
FIG. 19 shows the overlapping aggregate detail fields of view of a succession of shots along three adjacent flight lines.

FIG. 19 shows the overlapping aggregate detail fields of view 180 of a succession of shots along three adjacent flight lines that are part of a typical serpentine flight path 222, i.e. a subset of the flight lines that would make up a typical large-area survey. For clarity the corresponding overview fields of view 170 are omitted. The figure also shows the shot position 224 corresponding to each aggregate detail field of view 180, i.e. the position of the survey aircraft 230.

As already noted, traditional single-resolution aerial surveys are typically operated with 60/40 overlap, i.e. 60% forward (or longitudinal) overlap, and 40% side (or lateral) overlap. With the multi-resolution HyperCamera operated as shown in FIGS. 17 through 19, overview photos are captured with better than 85/40 overlap, and detail photos are captured with only 20/20 overlap at best.

Compared with a traditional single-resolution aerial camera system and a comparable aggregate detail pixel count (e.g. 160 Mpixel), the HyperCamera is between 2 and 3 times more efficient, as detailed below, with respect to both reduced survey flying time and fewer photos to process. The HyperCamera also has a higher efficiency than many aerial camera systems due to its high (detail) pixel count alone.

As an alternative to capturing both overview and detail photos, the HyperCamera can be used to capture detail photos only, with higher overlap (e.g. 60/40 rather than 20/20), to allow the creation of a photomosaic with higher spatial accuracy, but at greater capture and processing cost. In this case the overview camera 112 can be omitted.

To analyse the relative efficiency of a multi-resolution HyperCamera, assume a multi-resolution HyperCamera configuration with a lateral overlap of X %, a longitudinal overlap of Y %, N detail cameras 110, and M overview cameras 112, and for comparison, a single-resolution HyperCamera configuration with lateral overlap of A %, longitudinal overlap of B %, N detail cameras, and no overview camera. Assuming X is smaller than A, the improvement in lateral efficiency, as reflected in a greater flight-line spacing and shorter flying time and fewer detail photos captured, is given by $(1-X)/(1-A)$. Likewise, assuming Y is smaller than B, the improvement in longitudinal efficiency, as reflected in a greater shot spacing and shorter flying time and fewer detail photos captured, is given by $(1-Y)/(1-B)$. The overall improvement in efficiency is given by $(1-X)(1-Y)/(1-A)(1-B)$. This needs to be discounted by the overhead of capturing overview photos, i.e. multiplied by a factor of $(N/(N+M))$. For X/Y=20/20, A/B=60/40, N=5, and M=1, the net efficiency improvement is 2.2.

The greater efficiency comes at the cost of performing some photogrammetric calculations at the lower resolution of the overview camera 112 rather than at the higher resolution of the detail cameras 110. However, this is at least partially compensated for by the greater overlap between overview photos than in traditional practice.

Figure 20:
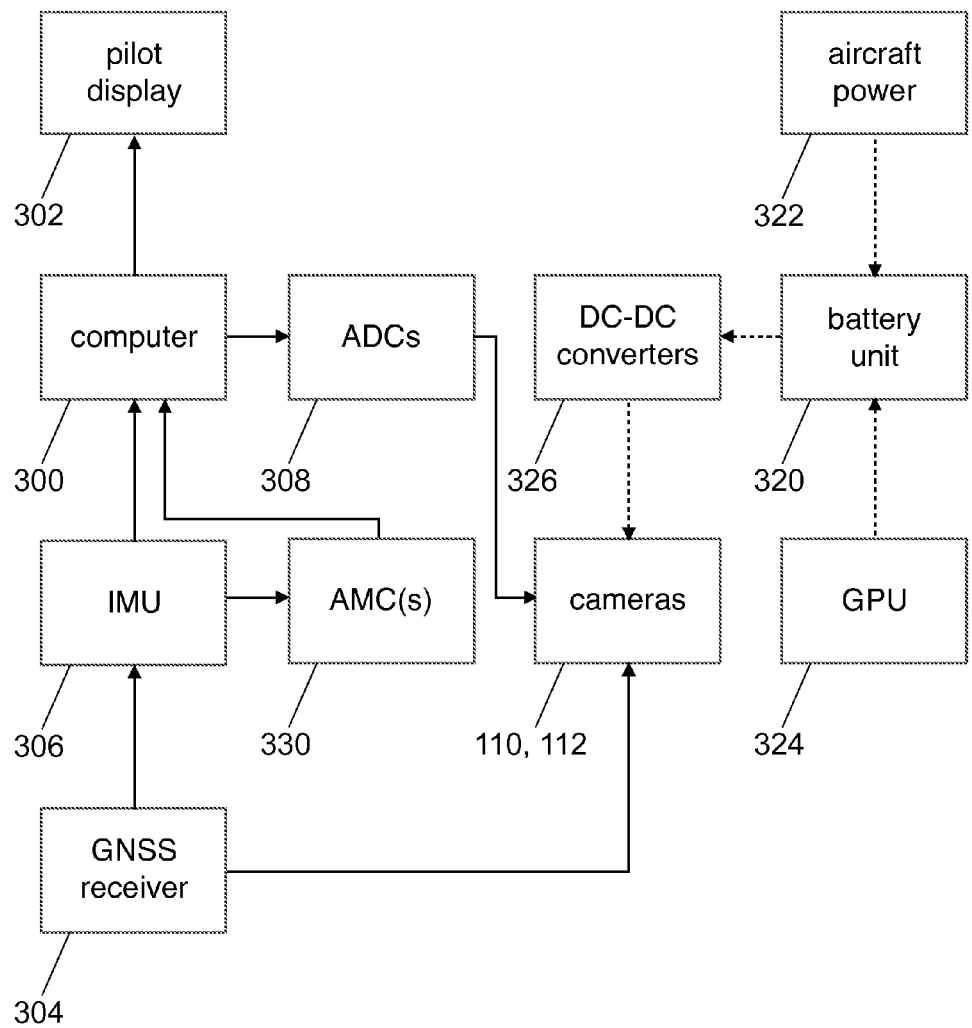
FIG. 20 shows a block diagram of a power and control system for the HyperCamera.

FIG. 20 shows a block diagram of a power and control system for the camera unit 100. The detail cameras 110 and overview camera 112 are controlled by a computer 300 via a set of analog-to-digital converters 308 (ADCs).

The computer 300 uses one or more Global Navigation Satellite System (GNSS) receiver 304 to monitor the position and speed of the survey aircraft 230 in real time. The GNSS receiver(s) may be compatible with a variety of space-based satellite navigation systems, including the Global Positioning System (GPS), GLONASS, Galileo and BeiDou.

The computer 300 provides precisely-timed firing signals to the cameras 110 and 112 via the ADCs 308, to trigger camera exposure, according to a stored flight plan and the real-time position and speed of the aircraft. If a camera 110 and/or 112 incorporates an auto-focus mechanism then the computer 300 also provides a focus signal to each such camera to trigger auto-focus prior to exposure.

The computer 300 fires the overview camera 112 and the detail cameras 110 at the same rate. Alternatively, the computer 300 may fire the overview camera 112 at a different rate to the detail cameras 110, i.e. either a higher rate or lower rate, to achieve a different overlap between successive overview photos, i.e. either a higher overlap or a lower overlap, independent of the overlap between successive detail photos. The computer 300 may fire the cameras simultaneously, or it may stagger the timing of the firing, e.g. to achieve a different alignment of photos longitudinally, or to reduce peak power consumption.

The flight plan describes each flight line making up the survey, and the nominal camera firing rate along each flight line required to ensure that the necessary overlap is maintained between successive shots. The firing rate is sensitive to the elevation of the terrain below the aircraft, i.e. the higher the terrain the higher the firing rate needs to be. It is adjusted by the computer 300 according to the actual ground speed of the aircraft, which may vary from its nominal speed due to wind and the pilot's operation of the aircraft.

The computer 300 also uses the flight plan and real-time GNSS position to guide the pilot along each flight line via a pilot display 302.

As shown in FIG. 20, the position data from the GNSS receiver is optionally augmented with orientation information (roll, pitch and yaw) from an inertial measurement unit 306 (IMU). This allows the computer 300 to provide enhanced feedback to the pilot on how closely the pilot is following the flight plan, and allows more accurate processing of the photos. In the absence of the IMU 306 the GNSS receiver connects directly to the computer 300.

Each camera 110 and 112 stores its shots locally, e.g. in removable flash memory. This eliminates the need for centralised storage in the HyperCamera system, and the need for a high-bandwidth data communication channel between the cameras and the centralised storage.

The GNSS position of each shot may be delivered to each camera 110 and 112, to allow the camera to tag each photo with its GNSS position.

One or more optional angular motion compensation (AMC) units 330, responsive to the orientation reported by the IMU 306, correct the orientation of the cameras so that they maintain a consistent pointing direction over time, despite the aircraft rolling, pitching or yawing during flight. This ensures that the captured photos can be used to create a photomosaic without gaps, while allowing the overlap between successive shots and between adjacent flight lines to be minimised.

The AMC 330 may consist of a platform with two or three axes of rotation (i.e. roll and pitch, or roll, pitch and yaw) upon which the HyperCamera unit 100 is mounted. Commercially-available AMC platforms include the PAV series from Leica Geosystems.

Alternatively, the AMC 330 may comprise one or more beam-steering mechanisms in the optical path of each camera (or group of cameras), whereby the pointing direction of the cameras is corrected by beam-steering.

Angular motion compensation becomes increasingly important as the flying altitude is increased and/or the GSD is decreased.

Motion blur due to the forward motion of the aircraft is equal to the speed of the aircraft multiplied by the exposure time of the camera. Once motion blur becomes a significant fraction of (or exceeds) the GSD it becomes useful to provide a forward motion compensation (FMC) mechanism to reduce or eliminate motion blur. FMC can be provided in a number of ways, including translating or rotating the optical axis of the camera (by moving the image sensor, or an intermediate mirror, or the camera itself), or by time delayed integration (TDI) of adjacent lines of pixels in the image sensor.

The computer 300 stores the GNSS position of each shot. This is used during subsequent processing of the photos to produce an accurate photomosaic. The computer 300 also stores the orientation of each shot if the IMU 306 is present, and stores the corrected orientation of each shot if an AMC 330 is present, based on correction information from the AMC.

The cameras 110 and 112 are powered by a battery unit 320. The battery unit 320 provides a voltage higher than the voltage required by all connected components, e.g. between 24V and 28V, and the voltage requirement of each connected component is provided via a DC-DC converter 326. For example, a Nikon D800 camera requires less than 10V. Additional DC-DC converters 326 also provide appropriate voltages to power the computer 300, the pilot display 302, the GNSS receiver 304, and the IMU 306. For clarity these power connections are omitted in FIG. 20.

The battery unit 320 contains two 12V or 14V batteries or a single 24V or 28V battery. It contains a charging circuit that allows it to be trickle-charged from an aircraft with a suitable auxiliary power source 322, allowing it to remain charged at all times. It may also be charged on the ground from a ground power unit 324 (GPU).

The ADCs 308 and DC-DC converters 326 may be housed in a camera control unit 310 (CCU). This may additionally include a USB interface to allow the computer 300 to control the ADCs.

The DC-DC converters 326 that provide power to the cameras 110 and 112 may be located in the CCU 310 or closer to the cameras in the distribution boxes 150.

Figure 21:
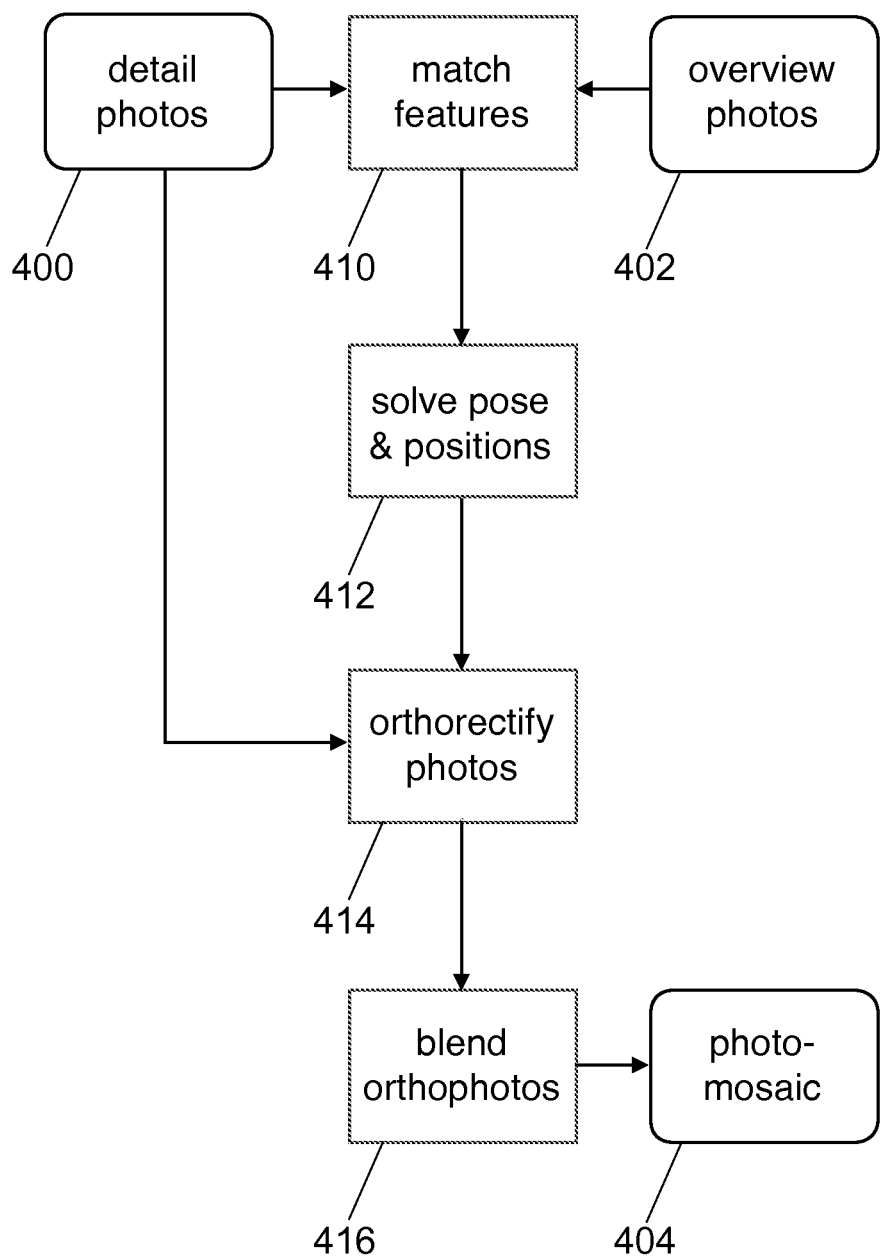
FIG. 21 shows a photogrammetric process flow for efficiently creating a photomosaic from multi-resolution HyperCamera photos.

Photos captured by the HyperCamera are intended to be seamlessly stitched into a photomosaic, and FIG. 21 shows a photogrammetric process flow for efficiently creating a photomosaic from multi-resolution HyperCamera photos. The process operates on detail photos 400 captured by the detail cameras 110, and overview photos 402 captured by the overview cameras 112.

The process consists of four main steps: (1) features are automatically detected in each of the photos 400 and 402 and matched between photos (step 410); bundle adjustment is used to iteratively refine initial estimates of the real-world three-dimensional position of each feature, as well as the camera pose (three-dimensional position and orientation) and camera calibration (focal length and radial distortion) associated with each photo (at step 412); each detail photo 400 is orthorectified according to its camera pose and terrain elevation data (at step 414); and the orthorectified photos (orthophotos) are blended to form the final photomosaic 404 (at step 416).

The elevation data (used at step 414) may be derived from the three-dimensional feature positions (refined during step 412); and/or may be derived from dense multi-view stereo matching between photos (see, for example, U.S. Pat. No. 8,331,615 (Furukawa), the contents of which are herein incorporated by reference); and/or may be obtained from another source such as a LIDAR survey of the area of interest. The elevation data may be in the form of a raster or vector digital elevation model (DEM), or in the form a three-dimensional point cloud, or in the form of a three-dimensional geometric model. It may include surface features such as vegetation and buildings, or may describe the bare earth.

The accuracy of the photomosaic 404 derives from the high overlap between lower-resolution overview photos 402, while detail in the photomosaic 404 derives from the higher-resolution detail photos 400.

As an alternative, as noted above, a survey may be flown with higher overlap between the detail photos 400, and the photomosaic may be created from the detail photos 400 only.

The photomosaic is typically stored as an image pyramid, i.e. within which different (binary) zoom levels are precomputed for fast access at any zoom level. Lower zoom levels in the pyramid are generated from higher zoom levels by low-pass filtering and subsampling, thus the entire pyramid may be generated from the detail-resolution photomosaic. As an alternative, lower zoom levels may be generated from a photomosaic created from the overview photos 402, in which case the overview photos 402 are also orthorectified and blended as described above for the detail photos 400.

An initial estimate of the camera pose of each photo, subsequently refined by the bundle adjustment process (at step 412), is derived from the GNSS position of each photo, as well as its IMU-derived orientation, if available.

The terrain data used to orthorectify (at step 414) the detail photos 400 may be based on 3D feature positions obtained from bundle adjustment (at step 412), or may be terrain data sourced from elsewhere (such as from a LiDAR aerial survey).

Automatically detected ground features may be augmented with manually-identified ground points, each of which may have an accurate surveyed real-world position (and is then referred to as a ground control point).

The V5-300 and V5-180 HyperCameras are two models from the HyperCamera range. Even greater efficiency is achieved by operating a higher altitudes with longer focal lengths, and additional HyperCamera configurations are described below.

FIG. 22 tabulates the GSD as a function of the flying altitude above ground (in feet) and the lens focal length from 100 mm to 600 mm (in 100 mm increments). It also tabulates the swath width (in km) of 30-degree and 45-degree fields of view as a function of altitude. In addition, it tabulates the number of detail cameras required to cover these fields of view as a function of focal length.

FIG. 23 further tabulates the GSD as a function of focal length from 700 mm to 1200 mm.

From the tables in FIGS. 22 and 23, it is instructive to compare the characteristics of the V5-300, V10-600 and V15-900 HyperCamera configurations. Each configuration has approximately the same 30-degree lateral field of view, but assuming a 5 cm GSD the corresponding swath widths are 1.6 km, 3.3 km and 4.9 km respectively (corresponding to flying altitudes of 10,000, 20,000 and 30,000 feet respectively). Crucially, the relative capture efficiency is then 1×, 2× and 3× respectively (assuming the same aircraft speed).

A 30-degree V10-600 HyperCamera can be realised using two 15-degree V5-600 HyperCamera units in tandem, each unit mounted on a wedge-shaped adapter plate 200 that induces the required 7.5-degree lateral tilt.

A 45-degree V15-600 HyperCamera can be realised using three 15-degree V5-600 HyperCamera units in tandem, the central unit mounted flat, and each of the two outside units mounted on a wedge-shaped adapter plate 200 that induces the required 15-degree lateral tilt.

A 30-degree V15-900 HyperCamera can be realised using three 10-degree V5-900 HyperCamera units in tandem, the central unit mounted flat, and each of the two outside units mounted on a wedge-shaped adapter plate 200 that induces the required 10-degree lateral tilt.

Alternatively or additionally to utilising a wedge shape to induce the required lateral tilt, the adapter plate 200 can comprise one or more gross and/or fine tilt adjustment mechanisms to allow the tilt of the camera unit 100 to be adjusted both nominally as well as to compensate for variations in the tilt of the aircraft floor. The tilt mechanisms may comprise one or more shims, one or more biasing screws, or similar.

Tilt adjustment can also be provided via the roll compensation mechanism of the angular motion compensation (AMC) unit 330, if present, by adjusting the pre-set nominal roll of the camera unit 100.

Figure 24A:
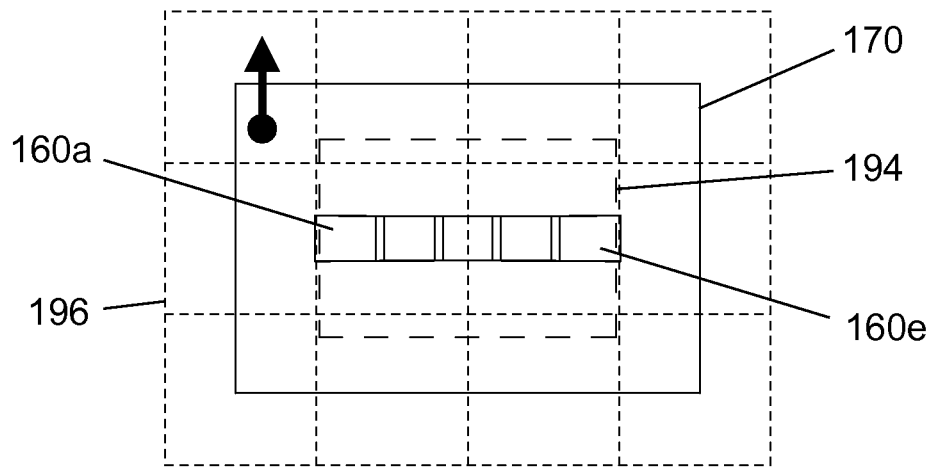
FIGS. 24A, 24B and 24C show the overview field of view and the overlapping detail fields of view of the V5-300, V10-600 and V15-900 HyperCameras respectively, at an altitude of 12,000 feet.
Figure 24B:
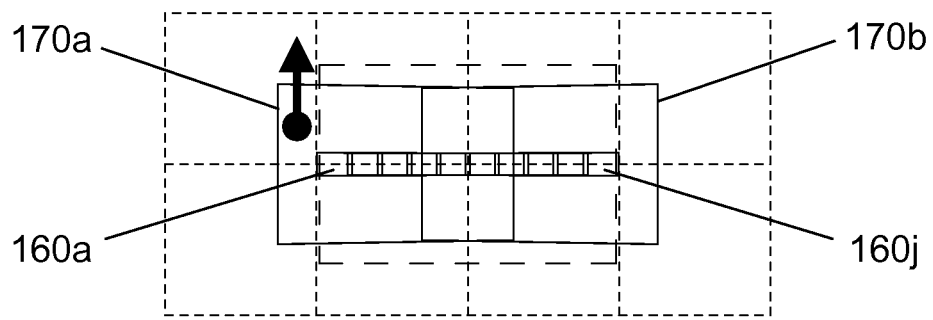
Figure 24C:
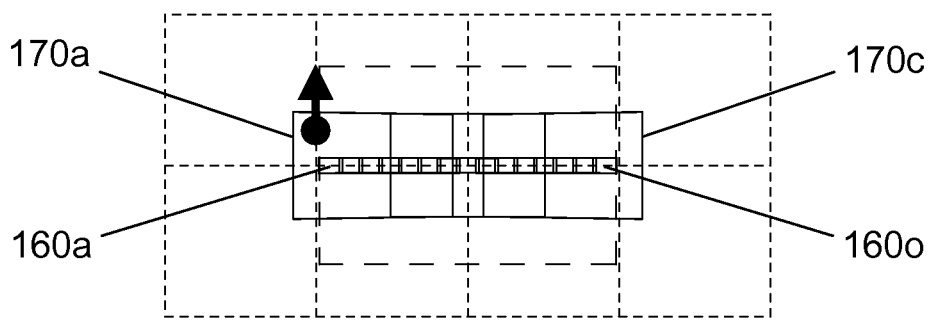

FIGS. 24A, 24B and 24C show the footprints of the V5-300, V10-600 and V15-900 HyperCameras respectively, at a constant flying altitude of 16,000 feet. The dashed grid in the figures has a 1 km spacing. The figures show the same swath width but with increasing GSD.

Figure 25A:
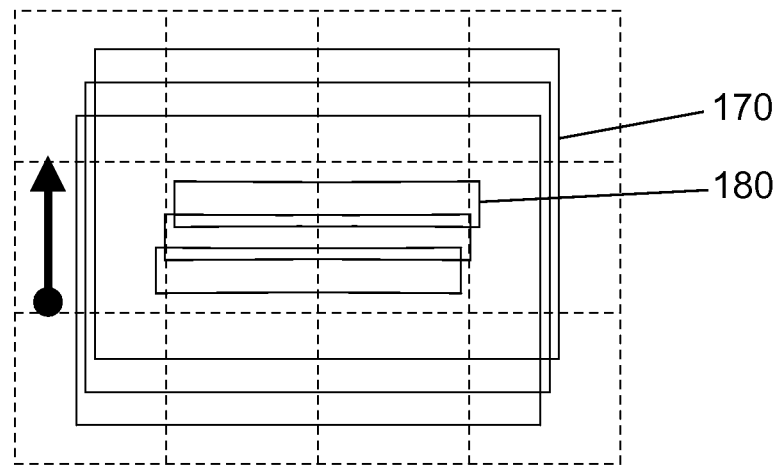
FIGS. 25A, 25B and 25C show the overlapping fields of view of three successive shots of the V5-300, V10-600 and V15-900 HyperCameras respectively, at an altitude of 12,000 feet.
Figure 25B:
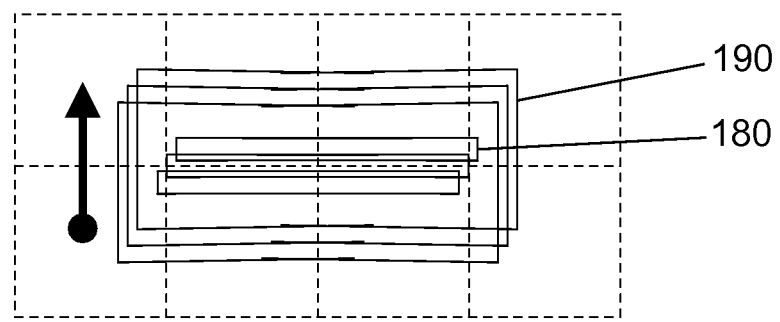
Figure 25C:
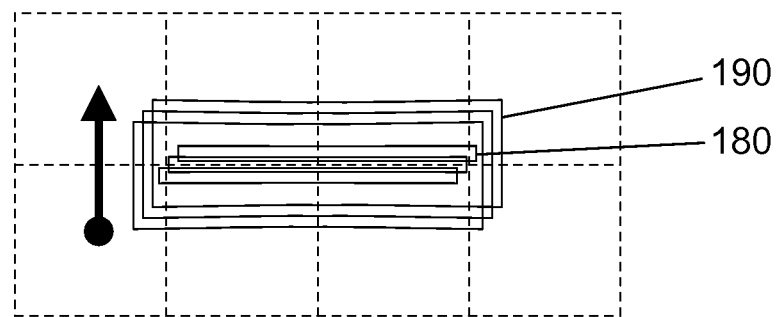

FIGS. 25A, 25B and 25C show three successive overlapping footprints of the V5-300, V10-600 and V15-900 HyperCameras respectively, at a constant flying altitude of 16,000 feet. In order to ensure adequate longitudinal overlap, the shot rate increases with increasing resolution.

Figure 26A:
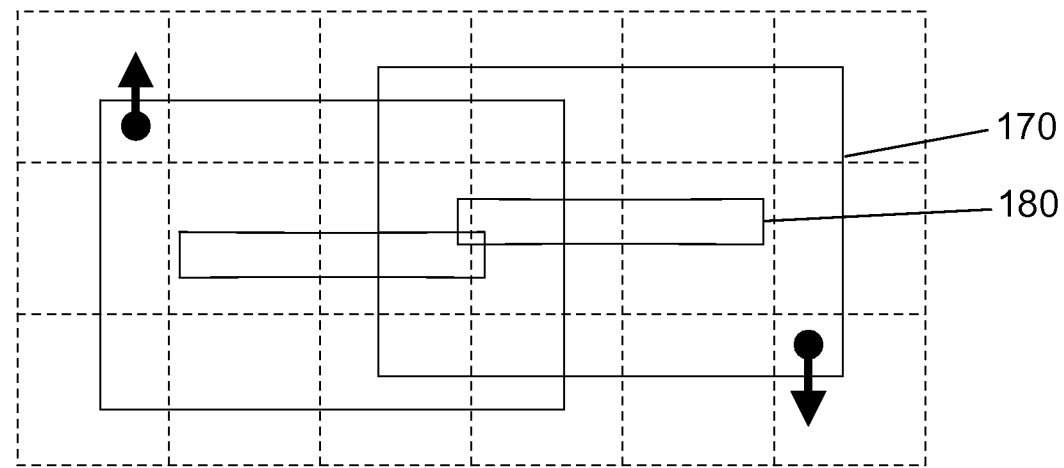
FIGS. 26A, 26B and 26C show the overlapping fields of view of shots in adjacent flight lines of the V5-300, V10-600 and V15-900 HyperCameras respectively, at an altitude of 12,000 feet.
Figure 26B:
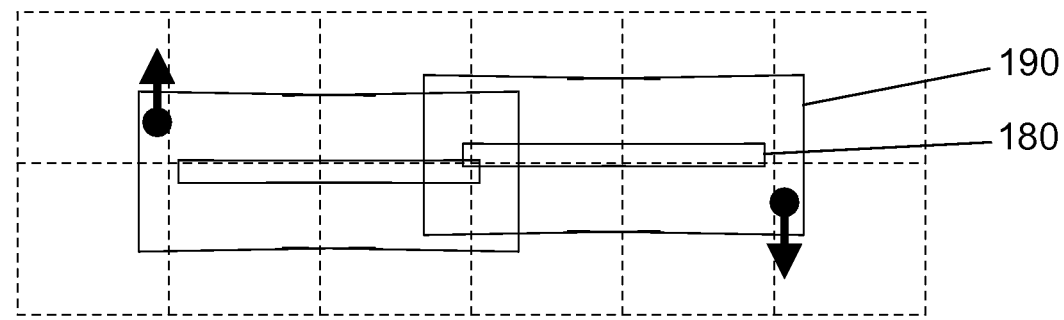
Figure 26C:
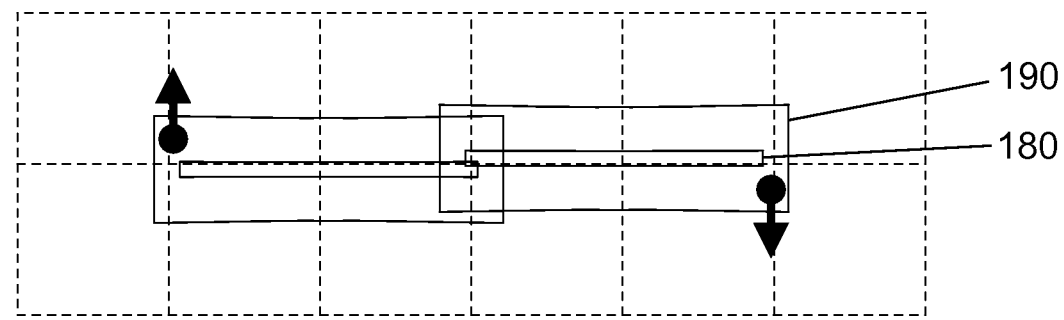

FIGS. 26A, 26B and 26C show two overlapping footprints from two adjacent flight lines of the V5-300, V10-600 and V15-900 HyperCameras respectively, at a constant flying altitude of 16,000 feet.

Figure 27:
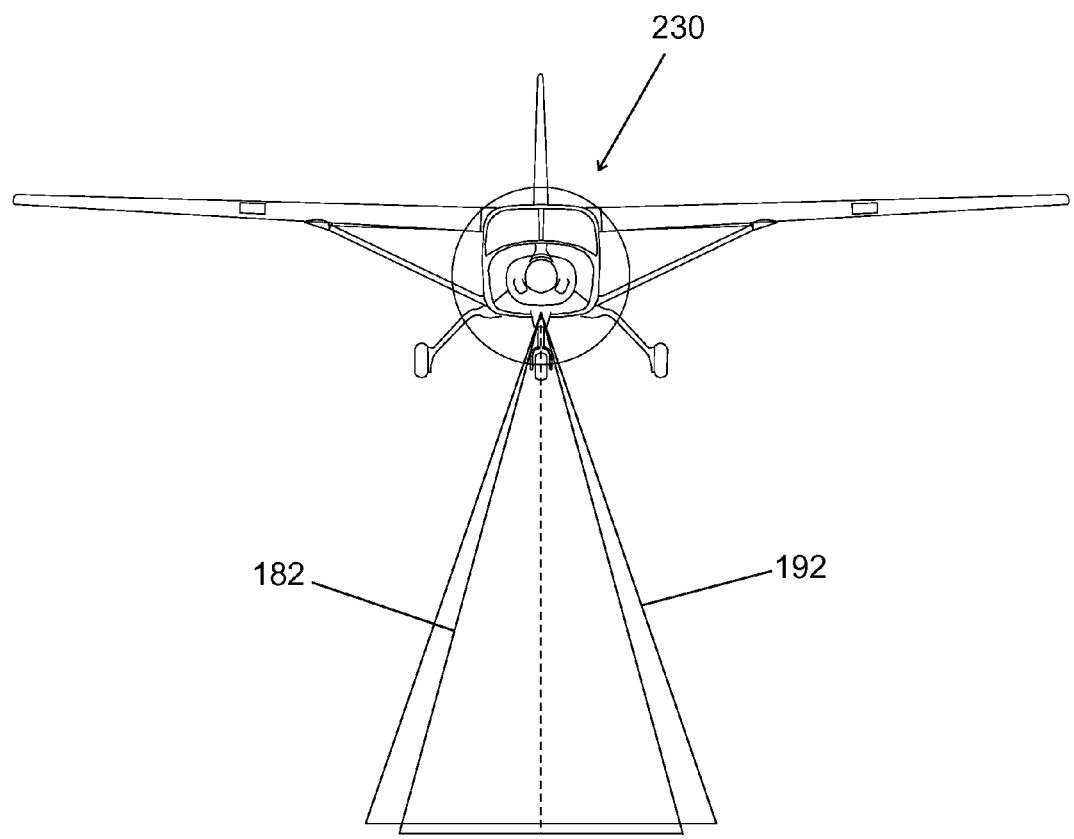
FIG. 27 shows a front elevation of a Cessna 208 aircraft carrying a V10-600 HyperCamera, consisting of two V5-600 HyperCamera units, and the resultant overview and aggregate detail fields of view.

FIG. 27 shows a front elevation of a Cessna 208 aircraft carrying a V10-600 HyperCamera comprising two V5-600 camera units, and the resultant overview and aggregate detail fields of view. The dashed line shows the division between the fields of view of the camera units.

Figure 28:
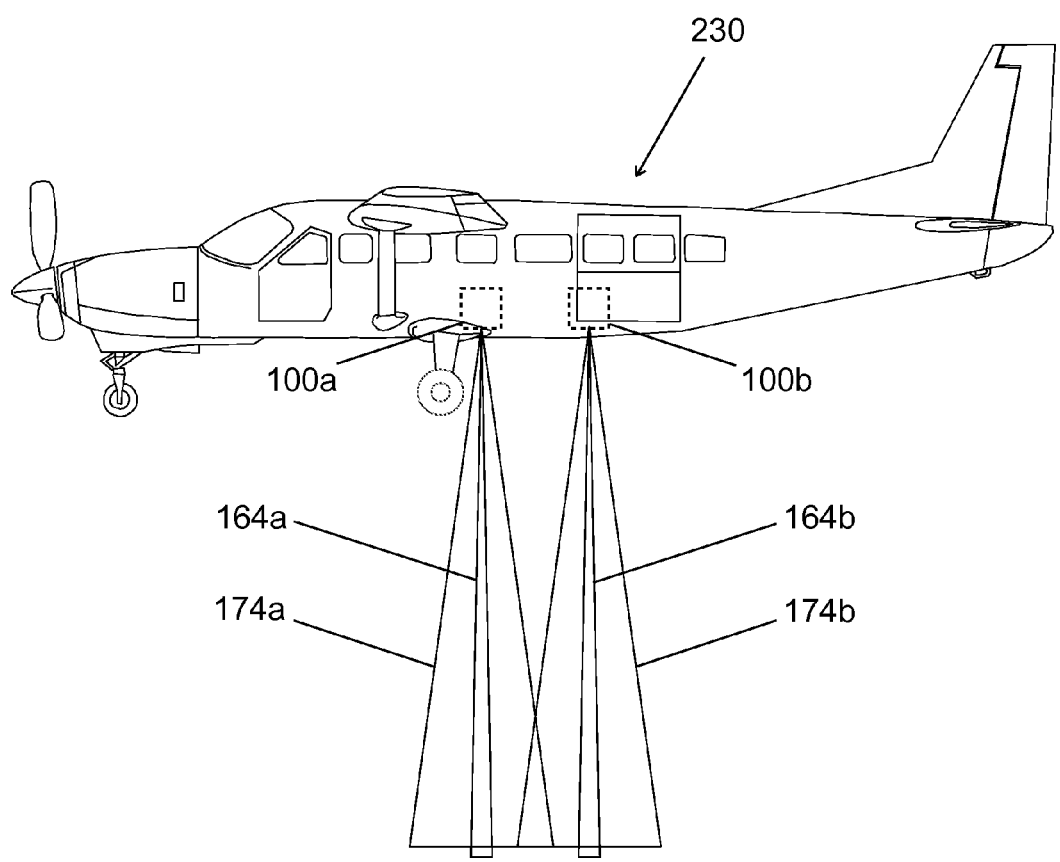
FIG. 28 shows a side elevation of a Cessna 208 aircraft carrying a V10-600 HyperCamera comprising two V5-600 camera units installed in the aircraft cabin, and the resultant overview and aggregate detail fields of view of each camera unit.

FIG. 28 shows a side elevation of a Cessna 208 aircraft carrying a V10-600 HyperCamera comprising two V5-600 camera units installed in the aircraft cabin, and the resultant overview and aggregate detail fields of view of each camera unit.

Figure 29:
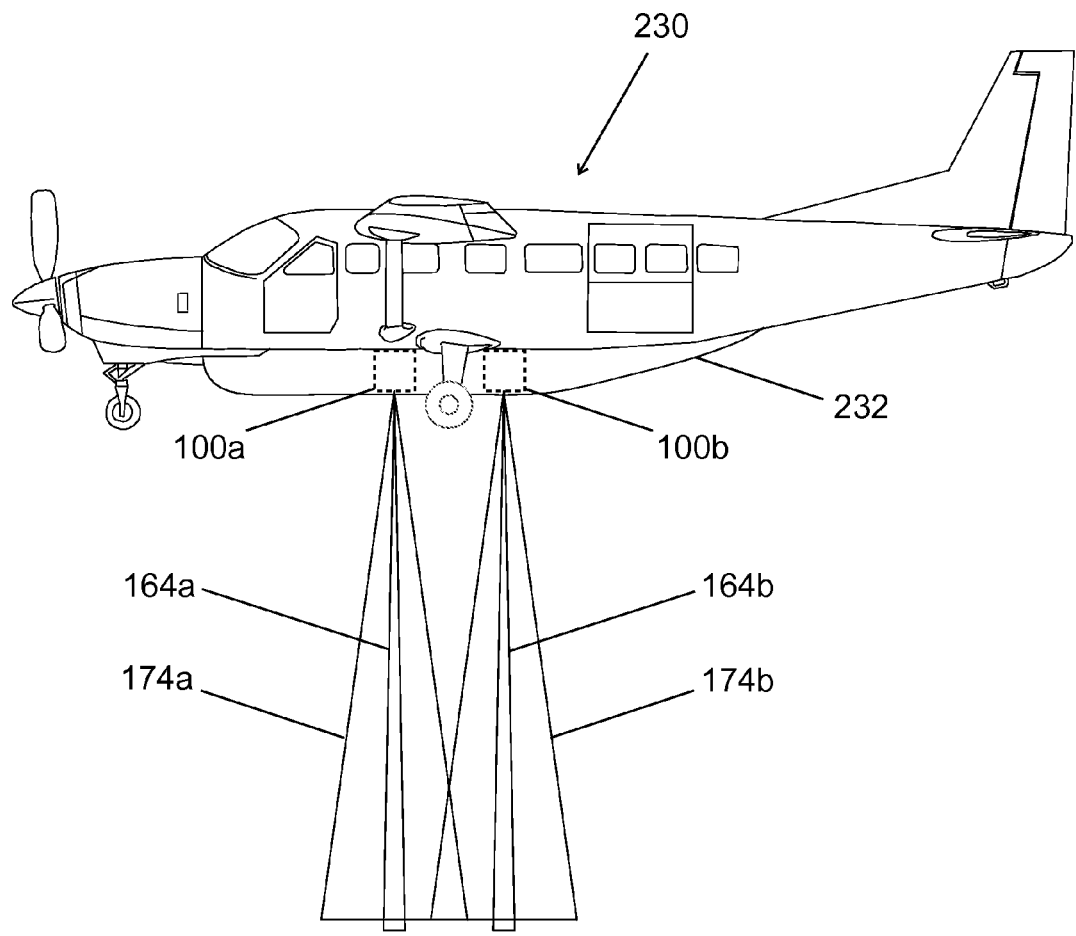
FIG. 29 shows a side elevation of a Cessna 208 aircraft carrying a V10-600 HyperCamera comprising two V5-600 camera units installed in a standard Cessna 208 bellymounted cargo pod, and the resultant overview and aggregate detail fields of view of each camera unit.

FIG. 29 shows a side elevation of a Cessna 208 aircraft carrying a V10-600 HyperCamera comprising two V5-600 camera units installed in a standard Cessna 208 belly-mounted cargo pod, and the resultant overview and aggregate detail fields of view of each camera unit.

Figure 30:
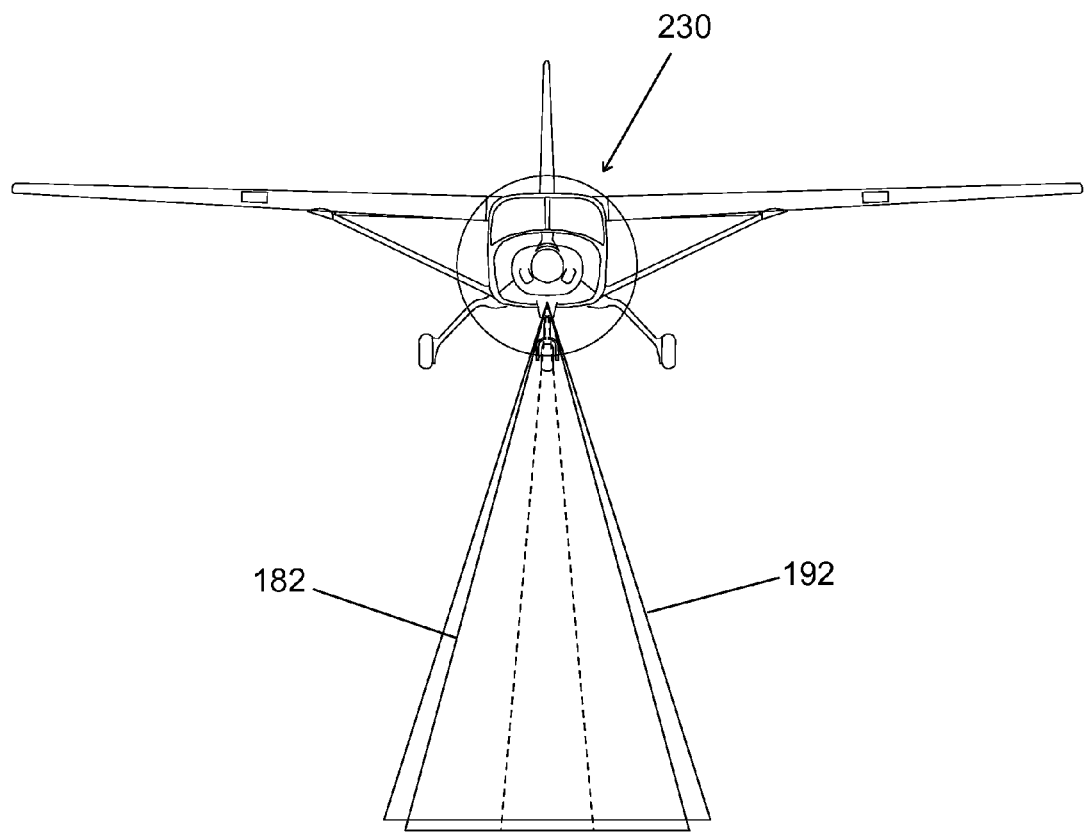
FIG. 30 shows a front elevation of a Cessna 208 aircraft carrying a V15-900 HyperCamera comprising three V5-900 camera units, and the resultant overview and aggregate detail fields of view. The dashed line shows the division between the fields of view of the camera units.

FIG. 30 shows a front elevation of a Cessna 208 aircraft carrying a V15-900 HyperCamera comprising three V5-900 camera units, and the resultant overview and aggregate detail fields of view. The dashed line shows the division between the fields of view of the camera units.

Figure 31:
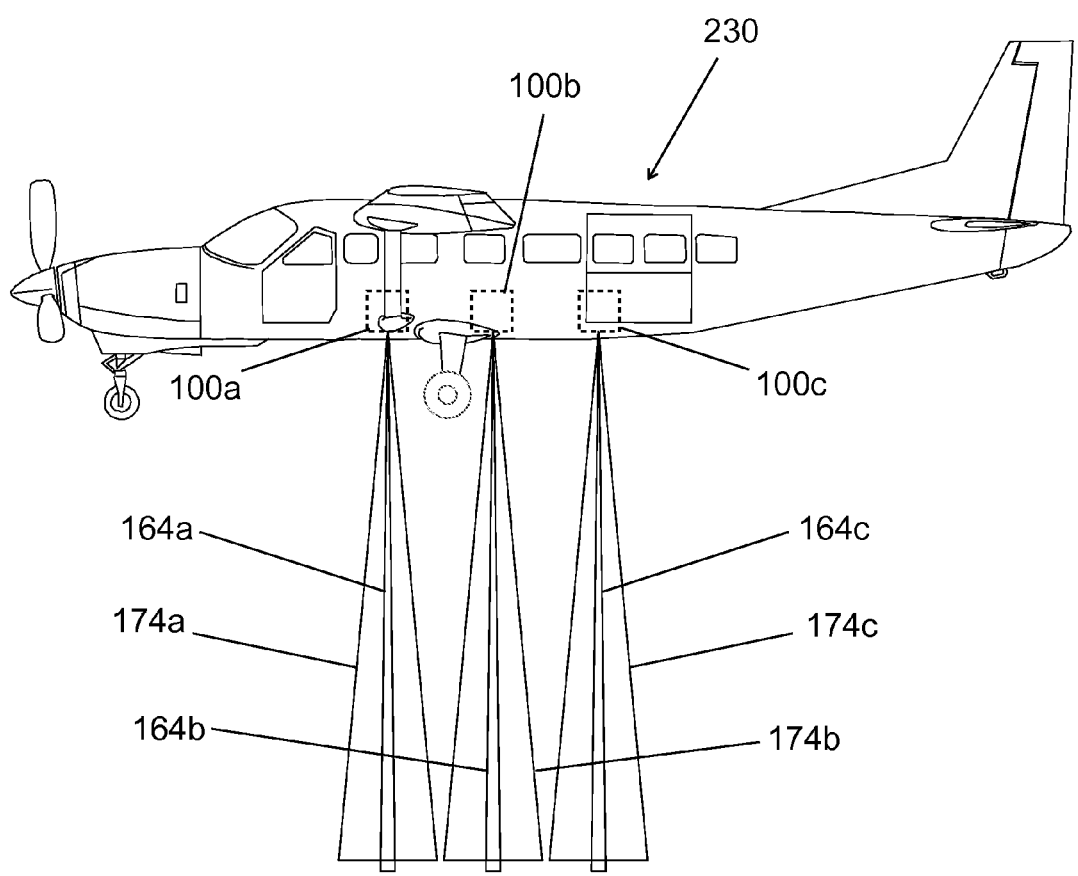
FIG. 31 shows a side elevation of a Cessna 208 aircraft carrying a V15-900 HyperCamera comprising three V5-900 camera units installed in the aircraft cabin, and the resultant overview and aggregate detail fields of view of each camera unit.

FIG. 31 shows a side elevation of a Cessna 208 aircraft carrying a V15-900 HyperCamera comprising three V5-900 camera units installed in the aircraft cabin, and the resultant overview and aggregate detail fields of view of each camera unit.

Figure 32:
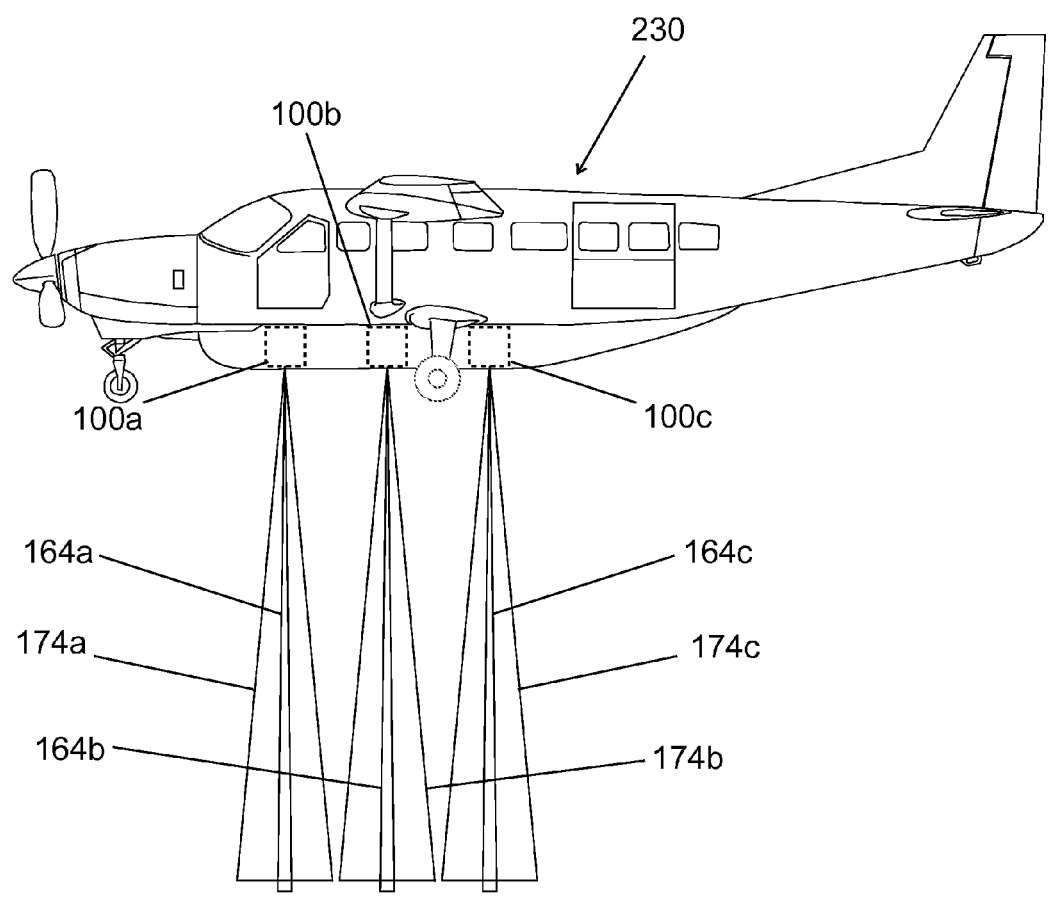
FIG. 32 shows a side elevation of a Cessna 208 aircraft carrying a V15-900 HyperCamera, comprising three V5-900 camera units installed in a standard Cessna 208 bellymounted cargo pod, and the resultant overview and aggregate detail fields of view of each camera unit.

FIG. 32 shows a side elevation of a Cessna 208 aircraft carrying a V15-900 HyperCamera, comprising three V5-900 camera units installed in a standard Cessna 208 belly-mounted cargo pod, and the resultant overview and aggregate detail fields of view of each camera unit.

Figure 33A:
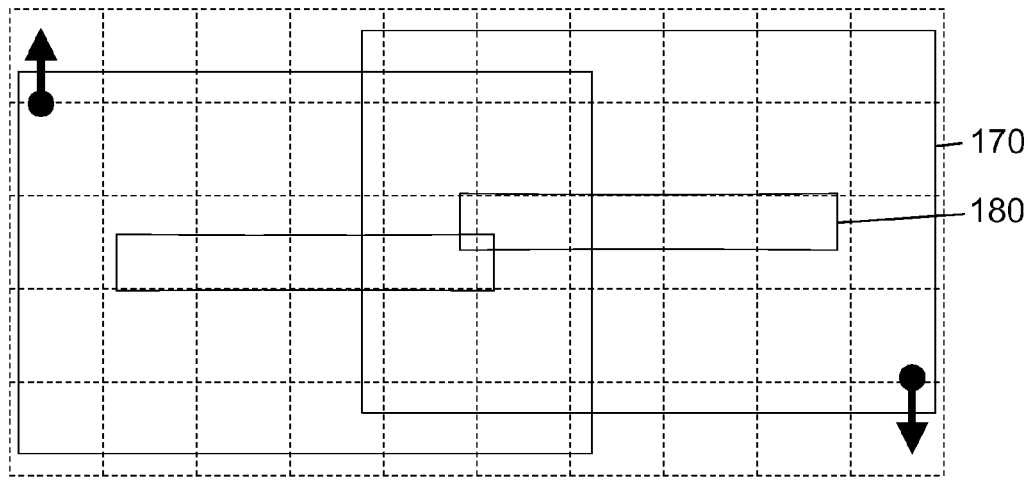
FIGS. 33A, 33B and 33C show two overlapping footprints from two adjacent flight lines of the V5-300, V10-600 and V15-900 HyperCameras respectively, at a constant flying altitude of 24,000 feet. The dashed grid in the figures has a 1 km spacing.
Figure 33B:
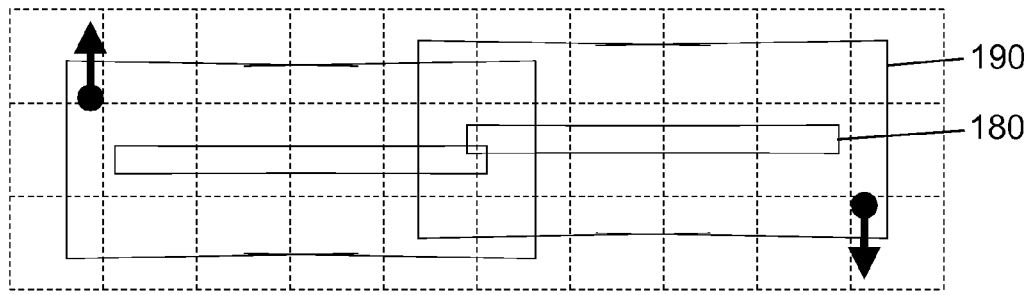
Figure 33C:
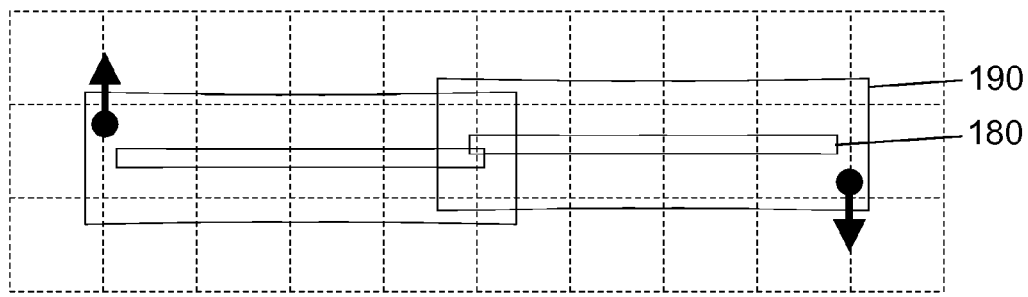

FIGS. 33A, 33B and 33C show two overlapping footprints from two adjacent flight lines of the V5-300, V10-600 and V15-900 HyperCameras respectively, at a constant flying altitude of 24,000 feet. The dashed grid in the figures has a 1 km spacing.

Figure 34A:
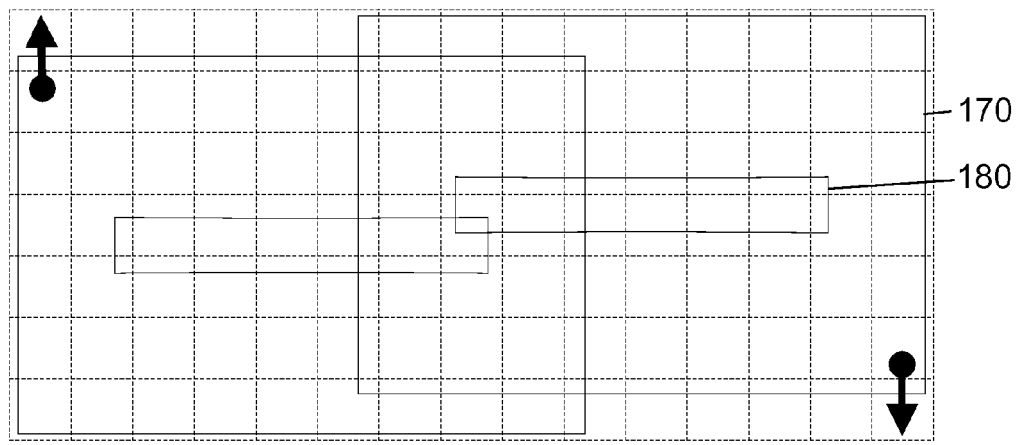
FIGS. 34A, 34B and 34C show two overlapping footprints from two adjacent flight lines of the V5-300, V10-600 and V15-900 HyperCameras respectively, at a constant flying altitude of 36,000 feet. The dashed grid in the figures has a 1 km spacing.
Figure 34B:
Figure 34C:
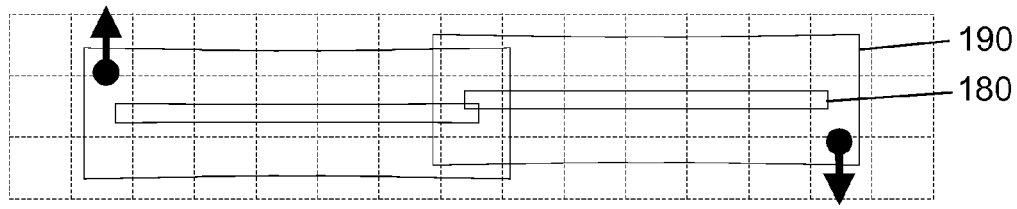

FIGS. 34A, 34B and 34C show two overlapping footprints from two adjacent flight lines of the V5-300, V10-600 and V15-900 HyperCameras respectively, at a constant flying altitude of 36,000 feet. The dashed grid in the figures has a 1 km spacing.

In general, a particular HyperCamera model can be realised using a number of identical smaller camera units 100, each mounted at the required lateral angle. As shown in the FIGS. 27 to 32, the individual camera units 100 can be mounted along the longitudinal axis of the aircraft. The firing of each camera unit 100 can be staggered to account for its longitudinal position and the aircraft speed, or the longitudinal offsets between photos from different camera units can be accounted for during downstream processing.

The HyperCamera design is thus modular, and suited to deployment in conjunction with one or more standard camera holes.

An oblique HyperCamera, i.e. with a pointing direction other than vertical (and typically with pointing direction of 45 degrees), can be realised using one or more vertical camera units 100 mounted at the required oblique angle, e.g. via a tilted adapter plate 200, or using one or more oblique camera units 100, each comprising an array of cameras mounted at the required oblique angle within an otherwise vertically-oriented frame.

Oblique aerial photos have several uses. They can be used to produce an oblique georeferenced photomosaic to provide a useful complement to a vertical photomosaic. They can be used along with vertical photos during photogrammetric bundle adjustment (as described above in relation to FIG. 21) to achieve higher accuracy, including higher elevation data accuracy. And they can be used to texture an elevation model or a full three-dimensional model of the area of interest, to support three-dimensional visualisation and interaction.

Figure 35A:
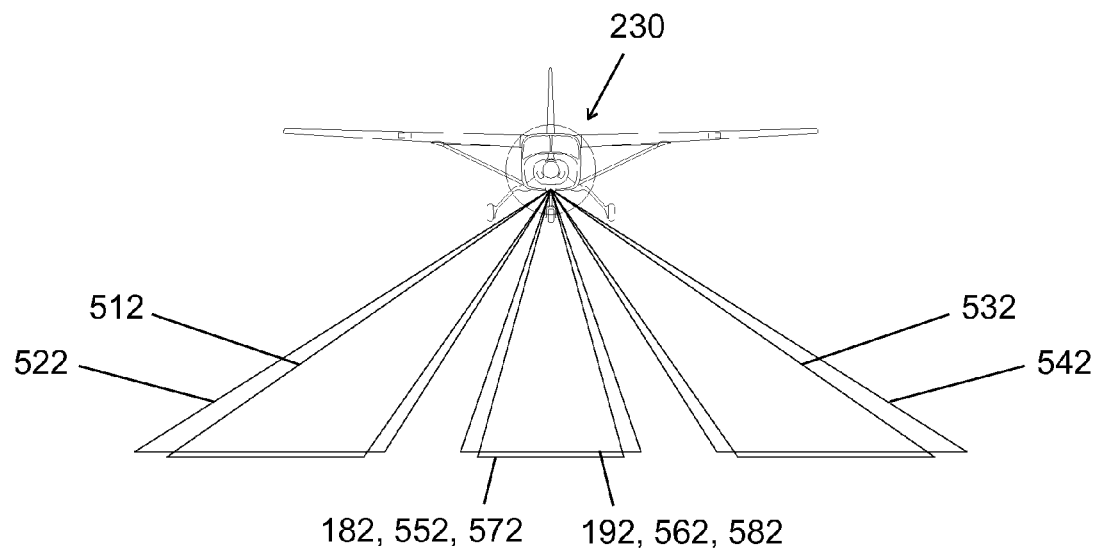
FIG. 35A and FIG. 35B show front and side elevations respectively of a Cessna 208 aircraft carrying five HyperCameras installed in the aircraft cabin: a vertical V10-600, a right oblique R10-600, a left oblique L10-600, a front oblique F10-600, and a back oblique B10-600, and the resultant overview and aggregate detail fields of view of each.
Figure 35B:
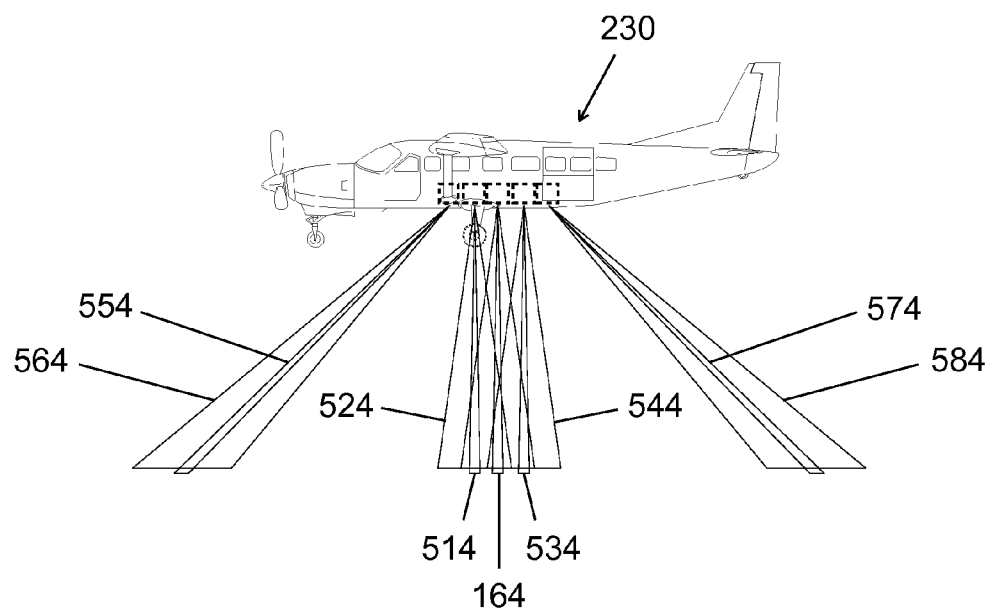

FIGS. 35A and 35B show front and side elevations respectively of a Cessna 208 aircraft carrying five Hyper-Cameras installed in the aircraft cabin: a vertical V10-600, a right oblique R10-600, a left oblique L10-600, a front oblique F10-600, and a back oblique B10-600, and the resultant overview and aggregate detail fields of view of each.

Figure 44:
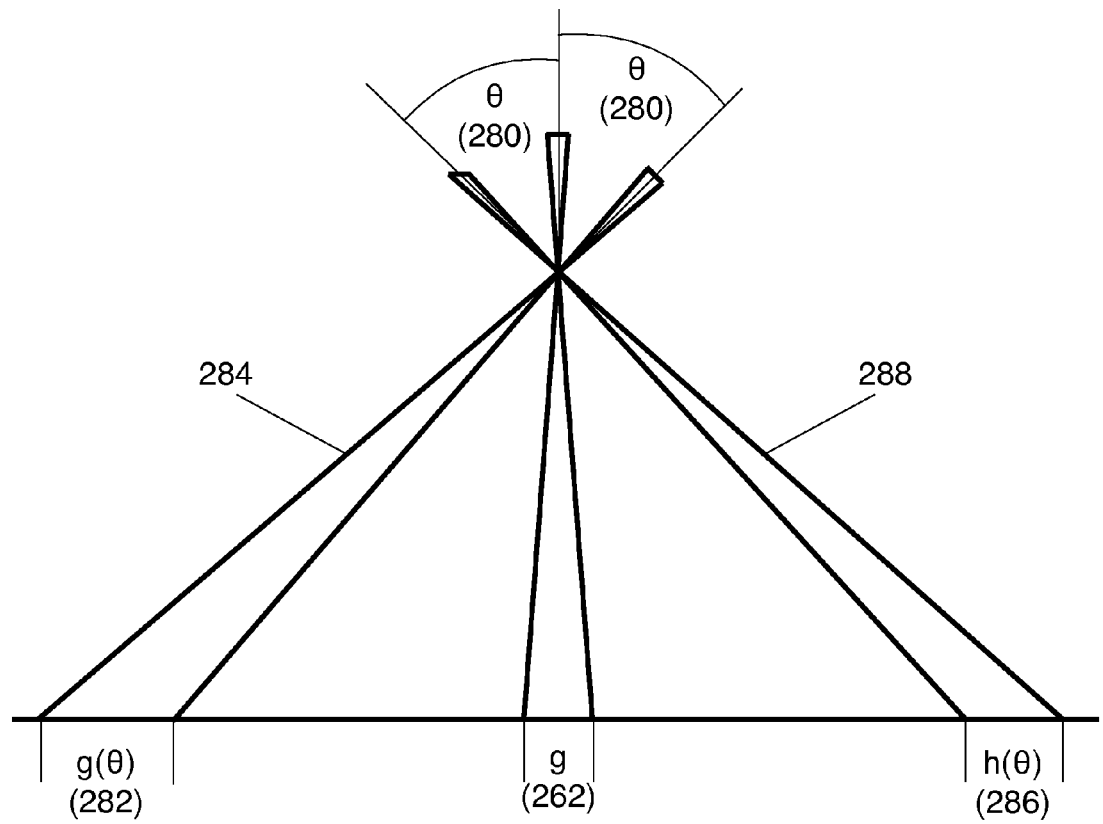
FIG. 44 shows a diagram and equations relating to the calculation of the resolution of tilted cameras.

The oblique GSD (282) of a camera tilted at an angle (280) away from the vertical is given by the EQ 9 in FIG. 44. The vertical GSD (262) is increased by a factor of the square of the secant of the tilt angle. The first secant term is due to the greater tilt-induced viewing distance, while the second secant term is due to the tilt-induced foreshortening of the ground. A tilted camera therefore needs to have a correspondingly longer focal length to match the GSD of a vertical camera.

For a tilt of 45 degrees the vertical GSD is increased by a factor of two, implying that a 45-degree oblique camera needs to have twice the focal length of a vertical camera to match the GSD of the vertical camera. In practice, however, there is no strict requirement to match the GSDs of vertical and oblique cameras, and any suitable focal length can be used for the oblique cameras.

If the image sensor of the camera is tilted to be parallel to the ground then the second secant term disappears. The oblique GSD (286) is then given by EQ 10 in FIG. 44. For a tilt of 45 degrees the vertical GSD (262) is then increased only by a factor of the square root of two, implying that a 45-degree tilted-sensor oblique camera needs to have 1.4 times the focal length of a vertical camera to match the GSD of the vertical camera.

However, the smaller GSD on horizontal surfaces is accompanied by a larger GSD on vertical surfaces such as the sides of buildings. This in turn may motivate a strategy of capturing oblique photos in multiple passes, with each pass optimised for a particular surface orientation via image sensor tilt.

Figure 36:
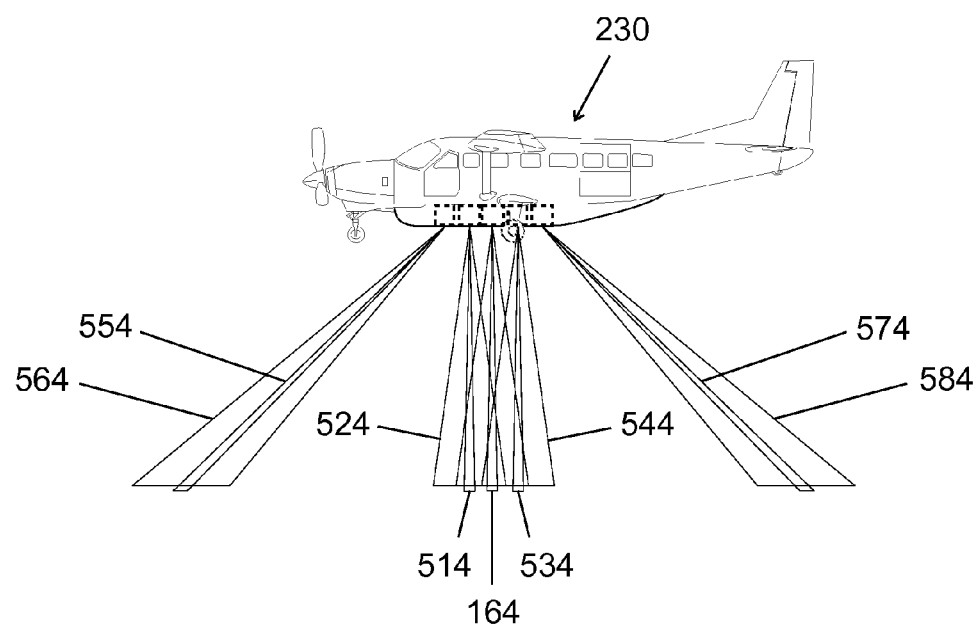
FIG. 36 shows a side elevations of a Cessna 208 aircraft carrying five HyperCameras installed in a standard Cessna 208 belly-mounted cargo pod: a vertical V10-600, a right oblique R10-600, a left oblique L10-600, a front oblique F10-600, and a back oblique B10-600, and the resultant overview and aggregate detail fields of view of each.

FIG. 36 shows a side elevation of a Cessna 208 aircraft carrying five HyperCameras installed in a standard Cessna 208 belly-mounted cargo pod: a vertical V10-600, a right oblique R10-900, a left oblique L10-900, a front oblique F10-900, and a back oblique B10-900, and the resultant overview and aggregate detail fields of view of each. Each oblique HyperCameras has a 45-degree pointing angle.

More generally, tilting the image sensor of any non-nadir camera to be (more) parallel to the ground can be used to reduce perspective foreshortening in photos captured by the camera and thus improve the GSD.

Each 900 mm oblique HyperCamera has a 33% larger GSD than the 600 mm vertical HyperCamera. A 1200 mm oblique HyperCamera would have the same GSD as the 600 mm vertical HyperCamera. An 850 mm tilted-sensor oblique HyperCamera would also have the same GSD as the 600 mm vertical HyperCamera.

Figure 37:
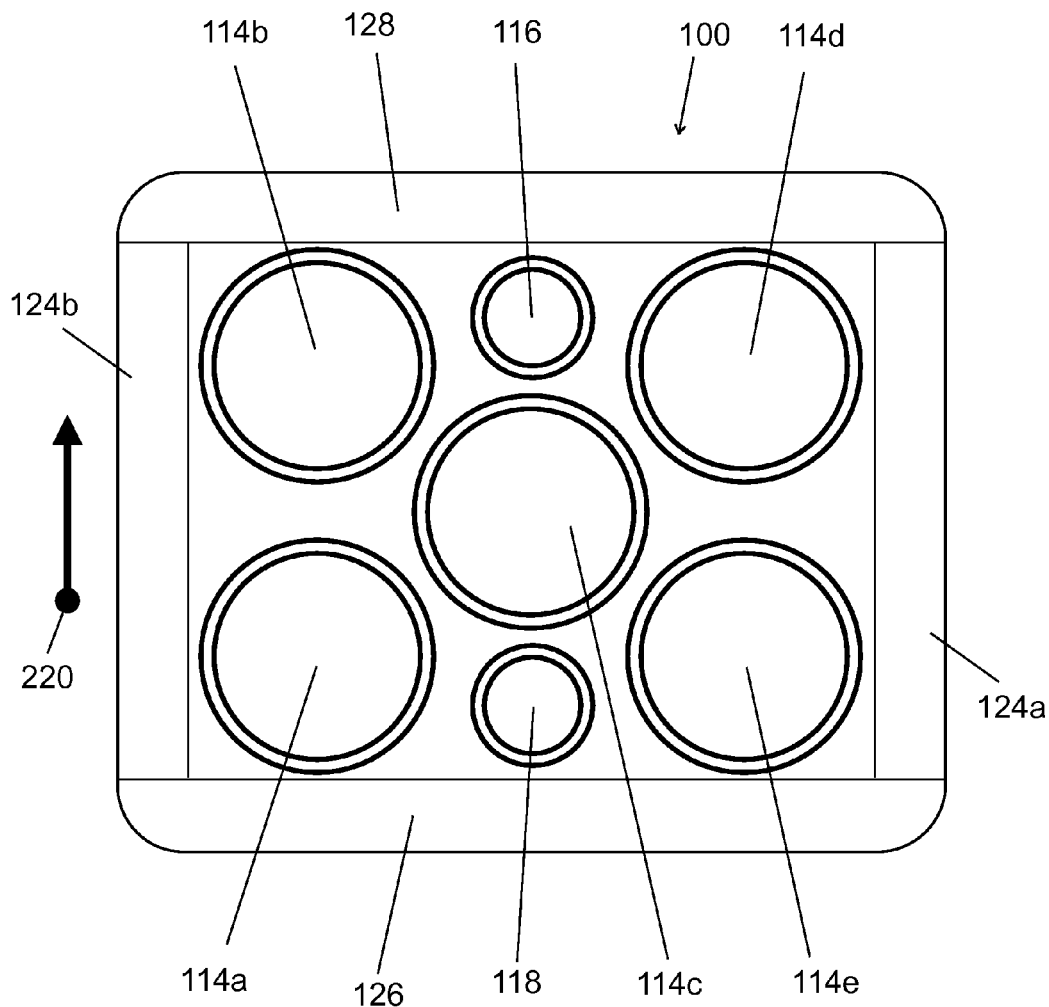
FIG. 37 shows a bottom view of the camera unit with an alternative arrangement of the cameras.

FIG. 37 shows a bottom view of the camera unit 100 where the detail cameras are arranged in an alternative "X" pattern to provide more room for longer detail lenses 114, i.e. to accommodate the larger diameters of longer lenses. This arrangement also provides room for a second lower-resolution camera (i.e. with a shorter lens) which can be utilised either for a second overview camera or for a dedicated spectral camera, such as a near-infrared (NIR) camera. Including a second overview camera allows both cameras to have a longer focal length and therefore provide greater resolution and hence photogrammetric accuracy. Including a near-infrared camera allows a near-infrared band to be included in the photomosaic, in turn supporting applications such as identifying vegetation.

As the focal length of the detail lenses 114 is increased, the size and weight of a purely refractive (dioptric) lens design becomes significant. A lighter and physically shorter lens with the same long focal length may be realised using a reflecting design, i.e. using curved mirrors for focusing, either using mirrors alone (catoptric) or in conjunction with corrective refractive elements (catadioptric). Astronomical telescopes, which are characterised by long focal lengths and large apertures, typically utilise reflecting designs. Classic modern designs include the Schmidt-Cassegrain, which combines spherical primary and secondary mirrors with a Schmidt correction plate, and the Ritchey-Chretien, which utilises hyperbolic primary and secondary mirrors.

Reflecting detail lenses 114 can thus be used to significantly reduce the size and weight of the camera unit 100, and this is particularly beneficial for longer focal lengths such as 900 mm and longer.

Figure 38:
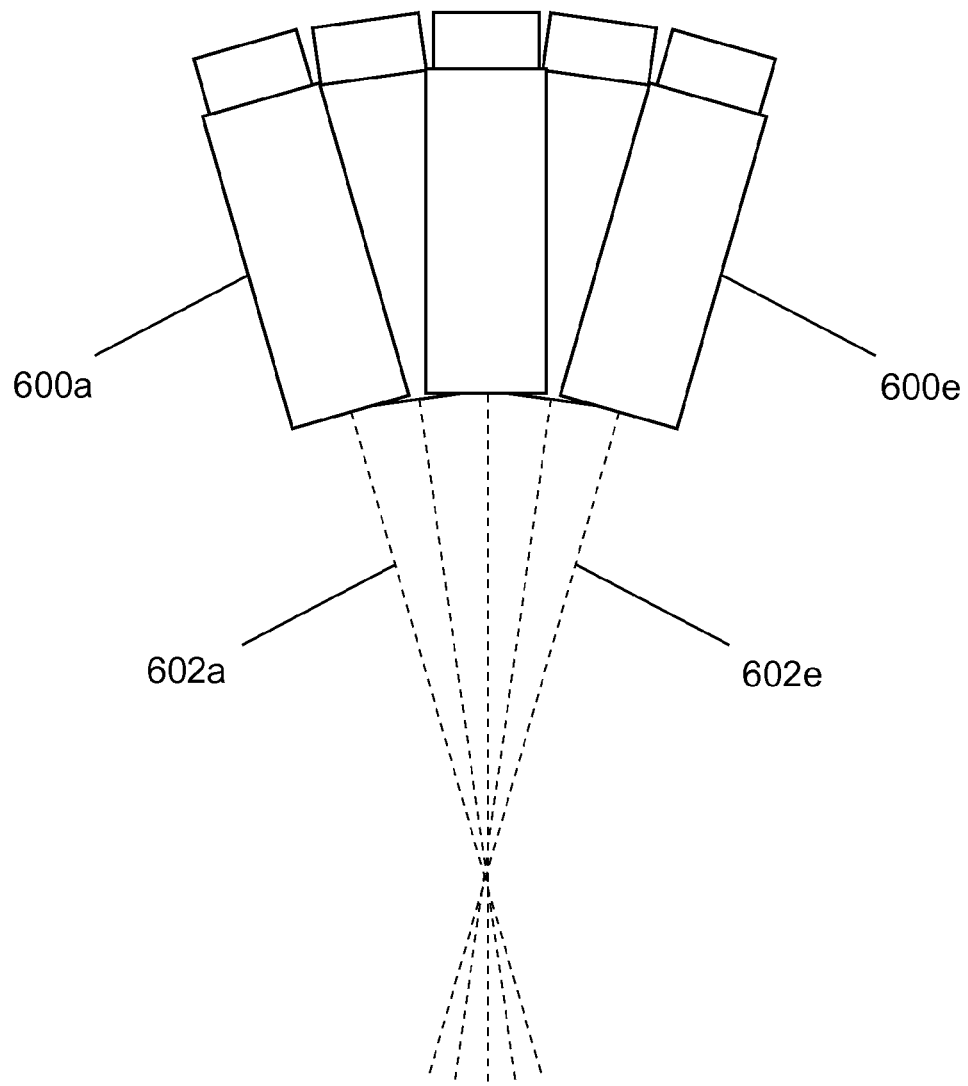
FIG. 38 shows a camera unit implemented as an array of cameras and their respective optical axes.

FIG. 38 shows a camera unit 100 implemented as an array of cameras 600, arranged in a fan, and the optical axis 602 of each camera. This figuratively represents any of the arrays of cameras in the foregoing description, detail or overview, and provides context for the following description. Each camera 600 consists of a camera body (e.g. 110 or 112) and a camera lens (e.g. 114 or 116).

Figure 39:
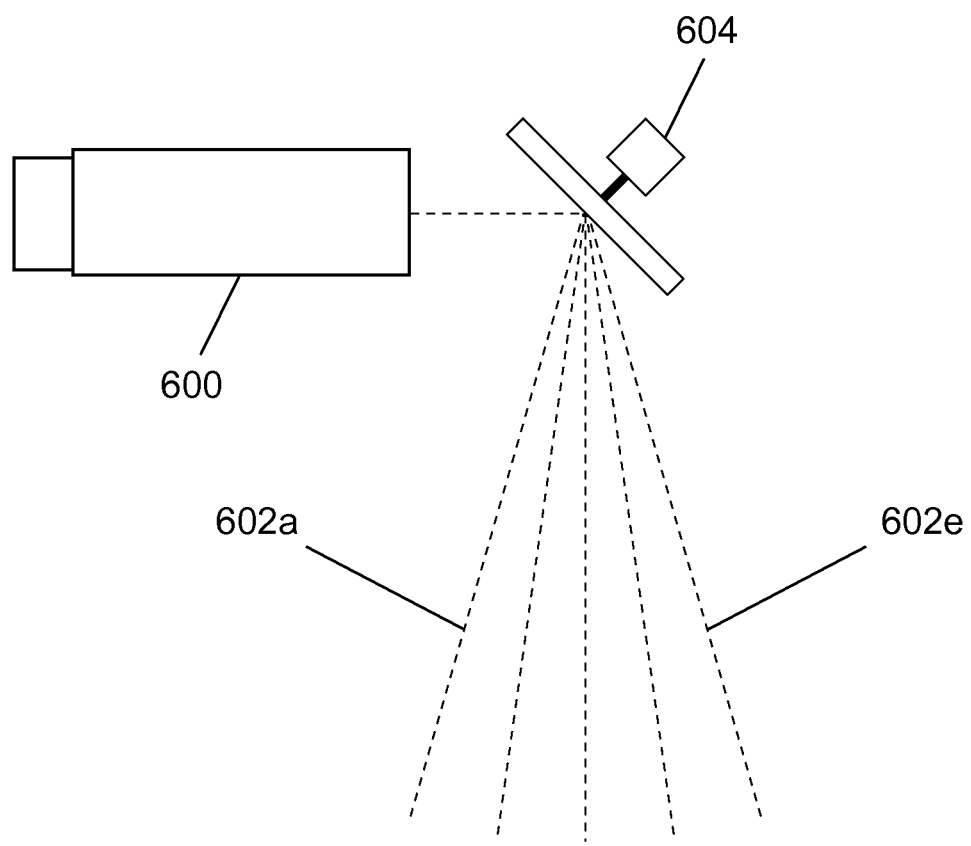
FIG. 39 shows a camera unit implemented as a single camera time-multiplexed via a steerable mirror to produce multiple optical paths.

FIG. 39 shows a camera unit 100 implemented as a single camera 600 time-multiplexed via a steerable mirror 604 to produce multiple optical paths. This allows a single camera to be used to implement an array of cameras using time-multiplexing, and thus reduces the number of physical cameras required to implement a HyperCamera, in turn reducing the size, weight and cost of each camera unit 100. As an alternative to a steerable mirror 604, any suitable beam-steering mechanism may be used.

Figure 40:
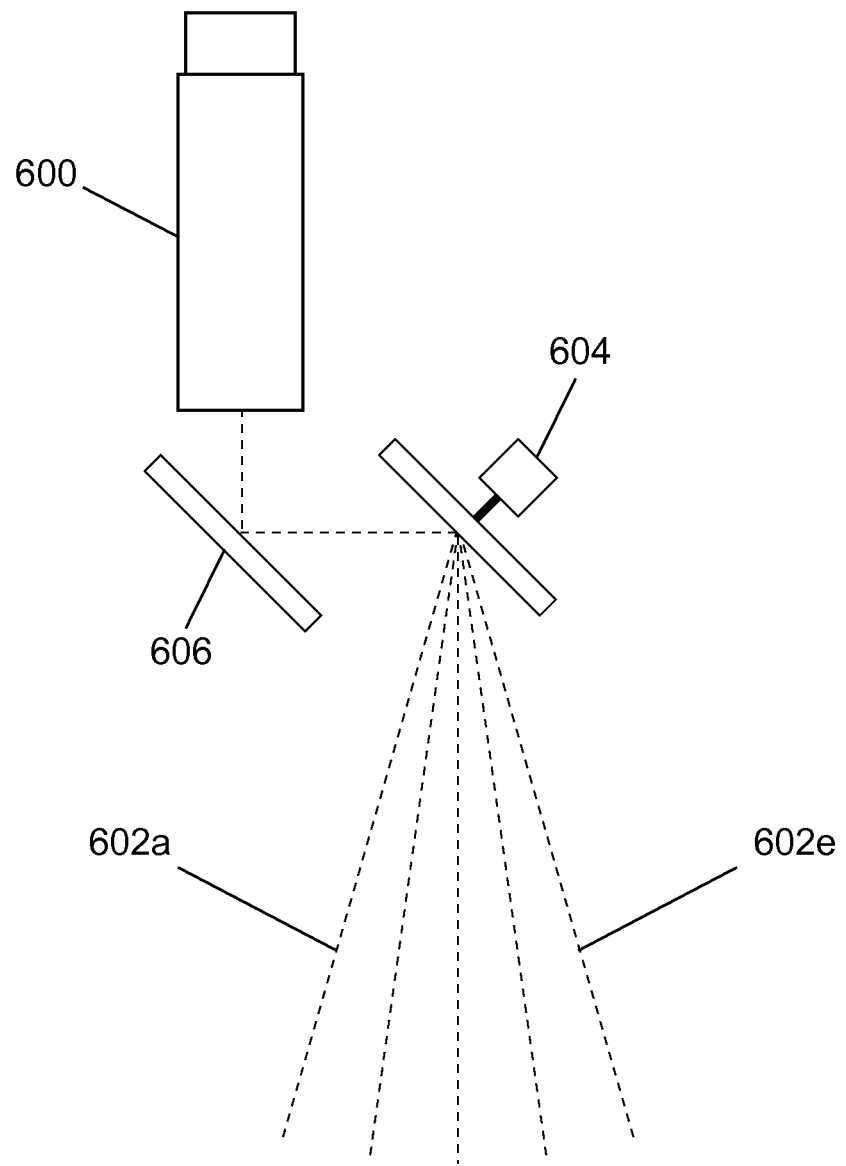
FIG. 40 shows an alternative configuration of a camera unit implemented as a single camera time-multiplexed via a steerable mirror to produce multiple optical paths.

FIG. 40 shows an alternative configuration of a camera unit 100 implemented as a single camera 600 time-multiplexed via a steerable mirror to produce multiple optical paths. The addition of a fixed mirror 606 allows the camera 600 to be mounted vertically, allowing the camera unit 100 to have a smaller footprint.

Figure 41:
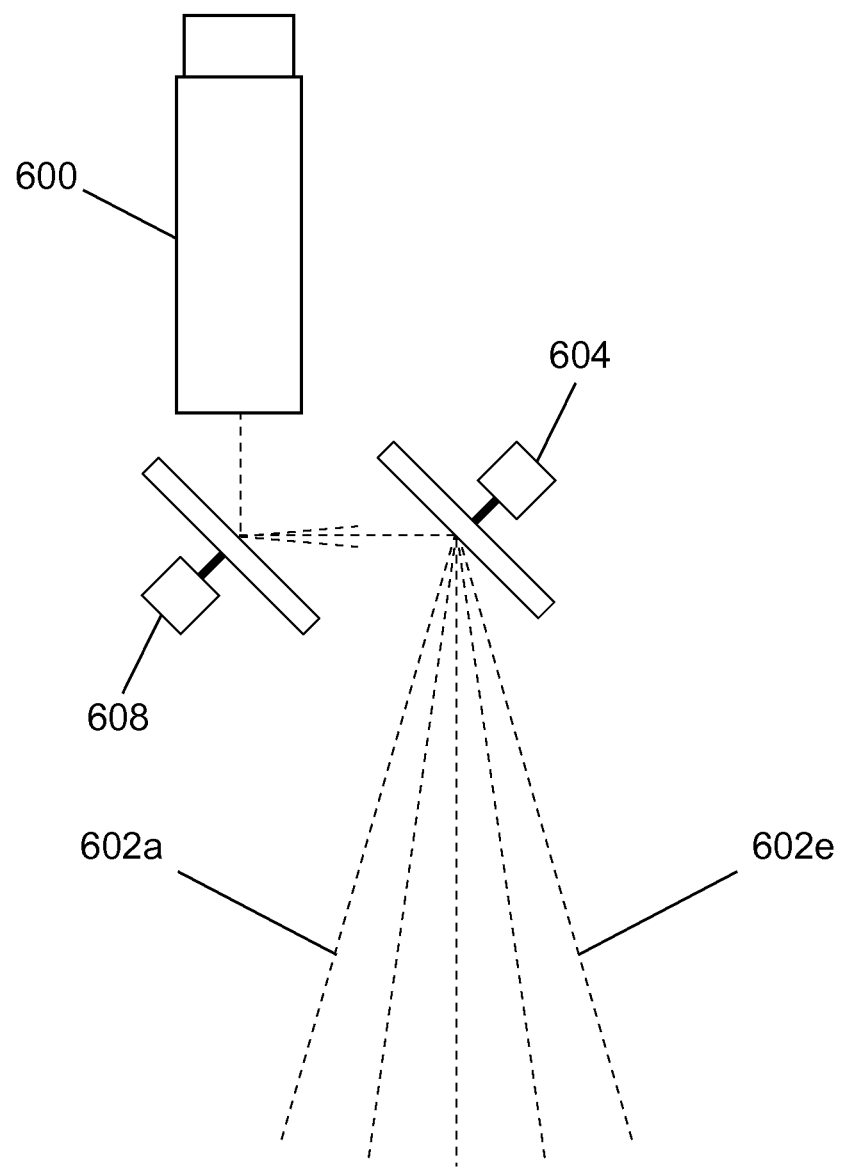
FIG. 41 shows a camera unit implemented as a single camera time-multiplexed via a steerable mirror to produce multiple optical paths, with a steerable mirror for angular motion compensation (AMC).

FIG. 41 shows a camera unit 100 implemented as a single camera 600 time-multiplexed via a steerable mirror to produce multiple optical paths, with an additional steerable mirror 608 providing angular motion compensation (AMC). This implements the IMU-driven AMC unit 330. As an alternative to a steerable mirror 608, any suitable beam-steering mechanism may be used.

The steerable mirror 608 may additionally or alternatively be used to implement a forward motion compensation (FMC) mechanism. In FMC mode the mirror is smoothly pitched backwards during exposure to match the forward motion of the aircraft, and is pitched forwards again between exposures. The pitch of the mirror 608 can driven directly, or can be oscillated at an appropriate rate to provide FMC, with camera exposure synchronised with the backwards phase of the oscillation. AMC and FMC may also be provided by separate cascaded mirrors.

The present invention has been described with reference to a number of preferred embodiments. It will be appreciated by someone of ordinary skill in the art that a number of alternative embodiments of the present invention exist, and that the scope of the invention is only limited by the attached claims.

The invention claimed is:

1. A system for capturing aerial images, the system comprising:
   at least one camera unit, the at least one camera unit comprising at least one detail camera mounted to substantially vertically orient an optical path thereof;
   a first steerable mirror configured to time-multiplex a pointing direction of the at least one detail camera to implement a virtual array of cameras with overlapping fields of view, thereby to allow the at least one detail camera to capture an extended field of view;
   an inertial measurement unit (IMU) configured to measure angular motion of the aircraft;
   a second steerable mirror configured to compensate, at least partially, for bending of the optical path of the at least one detail camera by the first steerable mirror; and
   an angular motion compensation unit (AMC), responsive to the measurement reported by the IMU, configured to control the second steerable mirror to compensate for the angular motion of the aircraft, thereby to ensure that the at least one detail camera points in a consistent direction over time.

2. The system of claim 1, wherein the at least one camera unit is attachable, above a camera hole, to at least one of: a floor of an aircraft and a floor of a pod carried by an aircraft, thereby providing the at least one detail camera with a view of the ground below the aircraft through the camera hole.

3. The system of claim 1, comprising a plurality of camera units, each camera unit mounted at a different angle so that the extended fields of view of the camera units overlap to form a larger extended field of view.

4. The system of claim 1, wherein the at least one camera unit comprises at least one overview camera, the at least one detail camera having a longer focal length than the at least one overview camera.

5. The system of claim 4, wherein the ratio of the focal length of the at least one detail camera to the focal length of the at least one overview camera is between 4 and 8.

6. The system of claim 1, wherein at least one detail camera has a lens selected from the group comprising: a dioptric lens, a catoptric lens, and a catadioptric lens.

7. The system of claim 1, further comprising a computer configured to automatically trigger exposure of the at least one detail camera during flight according to a stored flight plan and the real-time position of the aircraft.

8. The system of claim 7 further comprising at least one Global Navigation Satellite System (GNSS) receiver, the computer configured to receive and store position data from the at least one GNSS receiver in real time.

9. The system of claim 7, wherein the computer is configured to receive and store orientation data from the IMU in real time.

10. The system of claim 1 further comprising at least one forward motion compensation (FMC) mechanism, the at least one FMC mechanism configured to correct the effect, on the at least one detail camera, of forward motion of the aircraft, thereby to reduce motion blur in photos captured by the camera.

11. The system of claim 10, wherein FMC is provided via a mechanism selected from the group comprising: translating the image sensor of the at least one detail camera, rotating the image sensor of the at least one detail camera, translating the at least one detail camera, rotating the at least one detail camera, rotating a mirror in the optical path of the at least one detail camera, and time delayed integration of adjacent lines of pixels in the image sensor of the at least one detail camera.

12. The system of claim 10, wherein FMC is provided via a steerable mirror in the optical path of the at least one detail camera.

13. The system of claim 12, wherein the steerable FMC mirror is oscillated and exposure of the at least one detail camera is synchronised with the oscillation.

14. The system of claim 1, wherein the pointing direction of the at least one camera unit, relative to nadir, is selected from the group comprising: zero degrees and 45 degrees.

15. The system of claim 3, wherein the pointing direction of each camera unit, relative to nadir, is selected from the group comprising: zero degrees and 45 degrees.

16. The system of claim 1, wherein the image sensor of the at least one detail camera is tilted to reduce perspective foreshortening in photos captured by the camera.

17. The system of claim 12, wherein the steerable FMC mirror is the second steerable mirror.

* * * * *